US011727221B2

(12) United States Patent
Ravichandran et al.

(10) Patent No.: US 11,727,221 B2
(45) Date of Patent: Aug. 15, 2023

(54) DYNAMIC CORRELATED TOPIC MODEL

(71) Applicant: Spotify AB, Stockholm (SE)

(72) Inventors: Praveen Chandar Ravichandran, New York, NY (US); Mounia Lalmas-Roelleke, Saffron Walden (GB); Federico Tomasi, London (GB); Zhenwen Dai, London (GB); Gal Levy-Fix, Ithaca, NY (US)

(73) Assignee: Spotify AB, Stockholm (SE)

( * ) Notice: Subject to any disclaimer, the term of this patent is extended or adjusted under 35 U.S.C. 154(b) by 308 days.

(21) Appl. No.: 16/932,323

(22) Filed: Jul. 17, 2020

(65) Prior Publication Data

US 2022/0019750 A1   Jan. 20, 2022

(51) Int. Cl.
*G06F 40/44* (2020.01)
*G06F 40/295* (2020.01)
(Continued)

(52) U.S. Cl.
CPC .......... *G06F 40/44* (2020.01); *G06F 16/355* (2019.01); *G06F 17/15* (2013.01); *G06F 40/20* (2020.01); *G06F 40/295* (2020.01); *G06F 40/30* (2020.01)

(58) Field of Classification Search
CPC ........ G06F 40/44; G06F 16/355; G06F 17/15; G06F 40/295; G06F 40/279; G06F 40/284; G06F 40/30; G06F 16/285; G06F 16/35; G06F 40/10; G06F 16/9538; G06F 16/248; G10L 15/1815; G10L 15/063;
(Continued)

(56) References Cited

U.S. PATENT DOCUMENTS

2007/0255708 A1   11/2007   Morita et al.
2008/0263476 A1   10/2008   Vignoli et al.
(Continued)

FOREIGN PATENT DOCUMENTS

JP   3835730 B2 *   10/2006
JP   2006286058 A   10/2006

OTHER PUBLICATIONS

Li et al, "Pachinko allocation: DAG-structured mixture models of topic correlations", ICML '06: Proceedings of the 23rd international conference on Machine Learning, Jun. 2006, pp. 577-584 (Year: 2006).*

(Continued)

*Primary Examiner* — Linda Wong
(74) *Attorney, Agent, or Firm* — Merchant & Gould P.C.

(57) ABSTRACT

A system implements a dynamic correlated topic model (DCTM) to model an evolution of topic popularity, topic representation, and topic correlation within a set of documents, or other dataset, that spans a period of time. For example, the DCTM receives the set of documents and a quantity of topics for modeling. The DCTM processes the set by analyzing words of the documents, identifying word clusters representing the topics, and computing, for each topic, various distributions using continuous processes to capture a popularity, representation, and correlation with other topics across the period of time. In other examples, the dataset are user listening sessions comprised of media content items. Media content metadata (e.g., artist or genre) of the media content items, similar to words of a document, can be analyzed and clustered to represent topics for modeling by the DCTM.

22 Claims, 14 Drawing Sheets

(51) Int. Cl.
*G06F 16/35* (2019.01)
*G06F 40/20* (2020.01)
*G06F 40/30* (2020.01)
*G06F 17/15* (2006.01)

(58) Field of Classification Search
CPC ..... G10L 15/07; G10L 15/16; G10L 15/1822; G10L 25/30; G10L 17/06
See application file for complete search history.

(56) References Cited

U.S. PATENT DOCUMENTS

| | | | |
|---|---|---|---|
| 2012/0254755 A1 | 10/2012 | Wohlert | |
| 2013/0311163 A1* | 11/2013 | Somekh | G06N 20/00 703/21 |
| 2014/0019119 A1* | 1/2014 | Liu | G06F 40/10 704/9 |
| 2015/0277852 A1 | 10/2015 | Burgis | |
| 2017/0372221 A1* | 12/2017 | Krishnamurthy | G06N 20/00 |
| 2018/0349467 A1* | 12/2018 | Malhotra | G06F 16/285 |
| 2019/0294320 A1* | 9/2019 | Guttmann | G06V 20/20 |
| 2020/0250269 A1* | 8/2020 | Koseki | G06F 40/284 |
| 2022/0147716 A1 | 5/2022 | Tomasi | |

OTHER PUBLICATIONS

Crossno et al, "TopicView: Visually Comparing Topic Models of Text Collections", 2011 23rd IEEE International Conference on Tools with Artificial Intelligence, pp. 936-943 (Year: 2011).*

Ostrowski et al, "Using Latent Dirichlet Allocation for Topic Modelling in Twitter", Proceedings of the 2015 IEEE 9th International Conference on Semantic Computing (IEEE ICSC 2015), Feb. 7-9, 2015, pp. 493-497, (Year: 2015).*

Rasool Bhat et al, "Deep LDA : A new way to topic model", Journal of Information and Optimization Sciences, Jun. 30, 2019, pp. 1-10 (Year: 2019).*

Park et al., "Supervised Dynamic Topic Models for Associative Topic Extraction with a Numerical Time Series", TM 15 (2015).

Jahnichen, Patrick et al., "Scalable Generalized Dynamic Topic Models", arXiv:1803.07868v1 [stat.ML], Mar. 21, 2018, 12 pages.

Blei, Bavid et al., "Latent Dirichlet Allocation", Journal of Machine Learning Research 3 (2003), pp. 993-1022.

Blei, David et al., "Correlated Topic Models", located online at: http://papers.neurips.cc/paper/2906-correlated-topic-models.pdf, no date, 8 pages.

Blei, David et al., "Dynamic Topic Models", located online at: https://mimno.infosci.cornell.edu/info6150/readings/dynamic_topic_models.pdf, no date, 8 pages.

Bhadury, Arnab et al., "Scaling up Dynamic Topic Models", IW3C2 2016, Apr. 11-15, 2016, Montreal, Quebec, Canada, 10 pages.

Wang, Chong et al., "Continuous time dynamic topic models", UAI'08: Proceedings of the Twenty-Fourth Conference on Uncertainty in Artificial Intelligence, Jul. 2008, pp. 579-586.

* cited by examiner

DYNAMIC CORRELATED TOPIC MODEL

BACKGROUND

A topic model is a machine learning model that is useful for describing content of textual documents within a large document collection, among other dataset types, by discovering latent topics underlying the documents. For example, words comprising a document come from a mixture of topics. A topic is defined as a probability distribution over the words.

An important aspect associated with a textual document is when the document was written. For human writings, the popularity of topics, the representation (e.g., meaning) of topics, and correlation in co-occurrences of topics evolve over time. For example, for the topic of "machine learning", the distribution of the words associated with the topic (e.g., the representation or meaning of the topic) has been gradually changing over the past few years: first revolving around "neural networks", shifting towards "support vector machines" and "kernel methods", and then returning back to "neural networks" and introducing "deep learning". Due to the evolution of meaning, the topic of "machine learning" is likely to increasingly correlate with topics of "high performance computing" and "GPU" following the emerging of deep learning.

However, correlated topic models (CTMs) do not yield each of topic popularity, topic representation, and topic co-occurrence (e.g., correlation) in a dynamic manner, which prevents the CTM from learning such evolution over time.

SUMMARY

In general terms, this disclosure is directed to a dynamic correlated topic model (DCTM). In one possible configuration and by non-limiting example, the DCTM identifies underlying topics of a set of documents or user listening sessions that span a period of time, and models, for each topic, a topic popularity, a topic representation, and a correlation with other topics at given time points across the period of time to capture the evolution thereof. In some examples, the output of the DCTM can then be provided for post-processing such that the output can be utilized or further applied in a wide array of scenarios. Various aspects are described in this disclosure, which include, but are not limited to, the following aspects.

One aspect is a method for dynamically modeling topic correlation over time, the method comprising: receiving a set of documents each comprised of a plurality of words and having associated timestamps, wherein the timestamps of the set of documents span a period of time; identifying a quantity of topics for modeling; providing the set of documents as input to a DCTM for modeling based on the quantity of topics identified; and receiving, as output of the DCTM: a list of topics, wherein clusters of the plurality of words represent the topics; and for each topic: a popularity of the topic across the period of time; a representation of the topic across the period of time; and a correlation with other topics across the period of time.

Another aspect is a system for dynamically modeling topic correlation over time, the system comprising: a DCTM; and a server communicatively coupled to the DCTM, the server comprising at least one processing device and a memory coupled to the at least one processing device and storing instructions, that when executed by the at least one processing device, cause the at least one processing device to: receive a set of documents each comprised of a plurality of words and having associated timestamps, wherein the timestamps for the set of documents span a period of time; identify a quantity of topics for modeling; provide the set of documents as input to the DCTM for modeling based on the quantity of topics identified; and receive, as output of the DCTM: a list of topics, wherein clusters of the plurality of words represent the topics; and for each topic: a popularity of the topic across the period of time; a representation of the topic across the period of time; and a correlation with other topics across the period of time.

A further aspect is a system for dynamically modeling topic correlation related to user consumption of media content items over time, the system comprising: a DCTM; and a server communicatively coupled to the DCTM, the server comprising at least one processing device and a memory coupled to the at least one processing device and storing instructions, that when executed by the at least one processing device, cause the at least one processing device to: receive a set of user listening sessions each comprised of a plurality of media content items and having associated timestamps, wherein the plurality of media content items include one or more types of media content metadata and timestamps for the set of user listening sessions span a period of time; identify a quantity of topics for modeling; provide the set of user listening sessions as input to the DCTM for modeling based on the quantity of topics identified; and receive, as output of the DCTM: a list of topics, wherein clusters of at least one type of the one or more types of media content metadata represent the topics; and for each topic: a popularity of the topic across the period of time; a representation of the topic across the period of time; and a correlation with other topics across the period of time.

DETAILED DESCRIPTION

Figure 1:
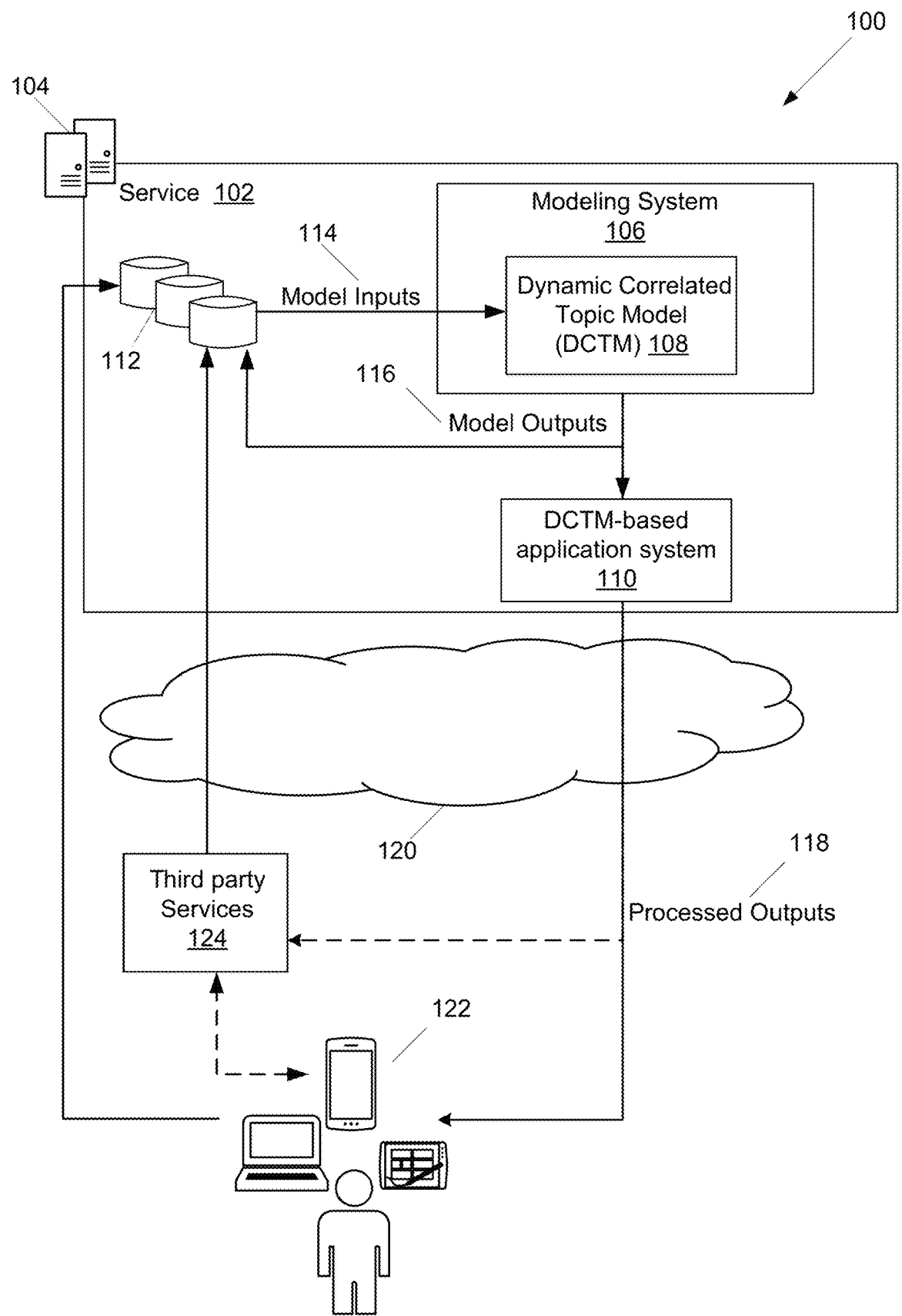
FIG. 1 illustrates an example modeling system that includes a dynamic correlated topic model (DCTM).

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 illustrates an example environment 100 where a modeling system 106 that includes a dynamic correlated topic model (DCTM) 108 is implemented to identify topics and model an evolution of topic popularity, topic representations, and correlations in co-occurrences of topics within a collection of data that spans a period of time.

The modeling system 106 is hosted by a service 102. In some examples, the service 102 can also host another system that utilizes outputs 116 of the DCTM 108 as inputs to derive additional information, referred to hereinafter as a DCTM-based application system 110. As one non-limiting example, the service 102 is a media streaming service that includes a media delivery system that utilizes the outputs 116 of the DCTM 108 for generating, monitoring, and/or providing media content items to users for consumption, as discussed in greater detail with references to FIGS. 11-14 below. One or more servers or processors 104 are operable to execute one or more components of the service 102, including the modeling system 106 and the DCTM-based application system 110. Additionally or alternatively, one or more DCTM-based application systems 110 can be hosted externally from the service 102.

The service 102 can also include one or more databases 112 for storing at least a portion of inputs 114 to the DCTM 108. The service 102 can receive the inputs 114 directly from client devices 122 or indirectly from one or more third party services 124 that collect the inputs 114 from the client devices 122 or otherwise store the inputs 114 in a database, library, or archive, for example. The service 102 can receive the inputs 114 over a network 120.

The inputs 114 include the data collection and a quantity of topics to be modeled. The data collection is a set of data items that span a period of time, where the data items are comprised of a vocabulary that can be clustered or grouped to represent one or more topics. A topic is defined as a probability distribution over the vocabulary. As one example and as described with reference to FIGS. 2 to 10, the data collection is a set of textual documents, and words of the textual documents are the vocabulary. For example, each textual document is comprised of words that can be clustered or grouped to represent topics, where a topic is a probability distribution over the words. Additionally, one or more of the textual documents of the set have associated time stamps spanning a period of time. Therefore, the DCTM 108 can dynamically model the topics over the period of time using continuous processes to understand how the popularity, representation and correlation of the topics have evolved over time.

The DCTM 108 can also be useful for describing other data types, such as a collection of timestamped user listening sessions comprised of media content items, to understand how user consumption of media evolves over time and apply that understanding to enhance future listening experiences. Therefore, as another example and as described with reference to FIGS. 11 to 14, the data collection is a set of user listening sessions comprised of media content items, and media content metadata is the vocabulary. For example, one or more types of media content metadata associated with the media content items, such as artists, genres, and mood, can be clustered or grouped to represent one or more topics, where a topic is defined as a probability distribution over the respective metadata type.

The modeling system 106 provides the inputs 114 to the DCTM 108 for modeling. The DCTM 108 analyzes the data items and identifies underlying topics by clustering the respective vocabulary into the specified quantity of topics. The outputs 116 of the DCTM 108 include a list of topics, each topic defined by a cluster of the respective vocabulary representing the topic. The outputs 116 further include, for each topic, a topic popularity, a topic representation, and a correlation with other topics at given time points across the period of time to illustrate the evolution thereof, thereby extending capabilities of traditional correlated topic models.

For example, in a traditional correlated topic model (CTM), a correlation in co-occurrence of topics is modeled in a non-dynamic manner. In some examples, one or more of the topic popularity and topic representation are also modeled in a non-dynamic manner by the traditional CTM. As described in greater detail with reference to FIG. 9, the DCTM 108 extends the capabilities of the traditional CTM by incorporating temporal dynamics through the use of continuous processes, including Gaussian processes and a generalized a Wishart process, to jointly model the evolution of the popularity of topics, representations of topics, and their correlations over time. Additionally, as described in greater detail with reference to FIG. 9, a stochastic variational inference (SVI) method is used that enables minibatch training of the DCTM 108 with stochastic gradient descent methods to enable faster training with lower processing requirements, and is scalable to large numbers of data such that the DCTM 108 can be used to analyze large data collections received as inputs 114.

The outputs 116 of the model can be stored in the databases 112 and/or provided to the DCTM-based application system 110 as inputs for further processing. Processed outputs 118 generated by the DCTM-based application system 110 can be provided to the client devices 122 or the third party services 124. In some examples, the outputs 116 can be provided to the client devices 122 or the third party services 124, alternatively or in addition to the processed outputs 118.

Figure 2:
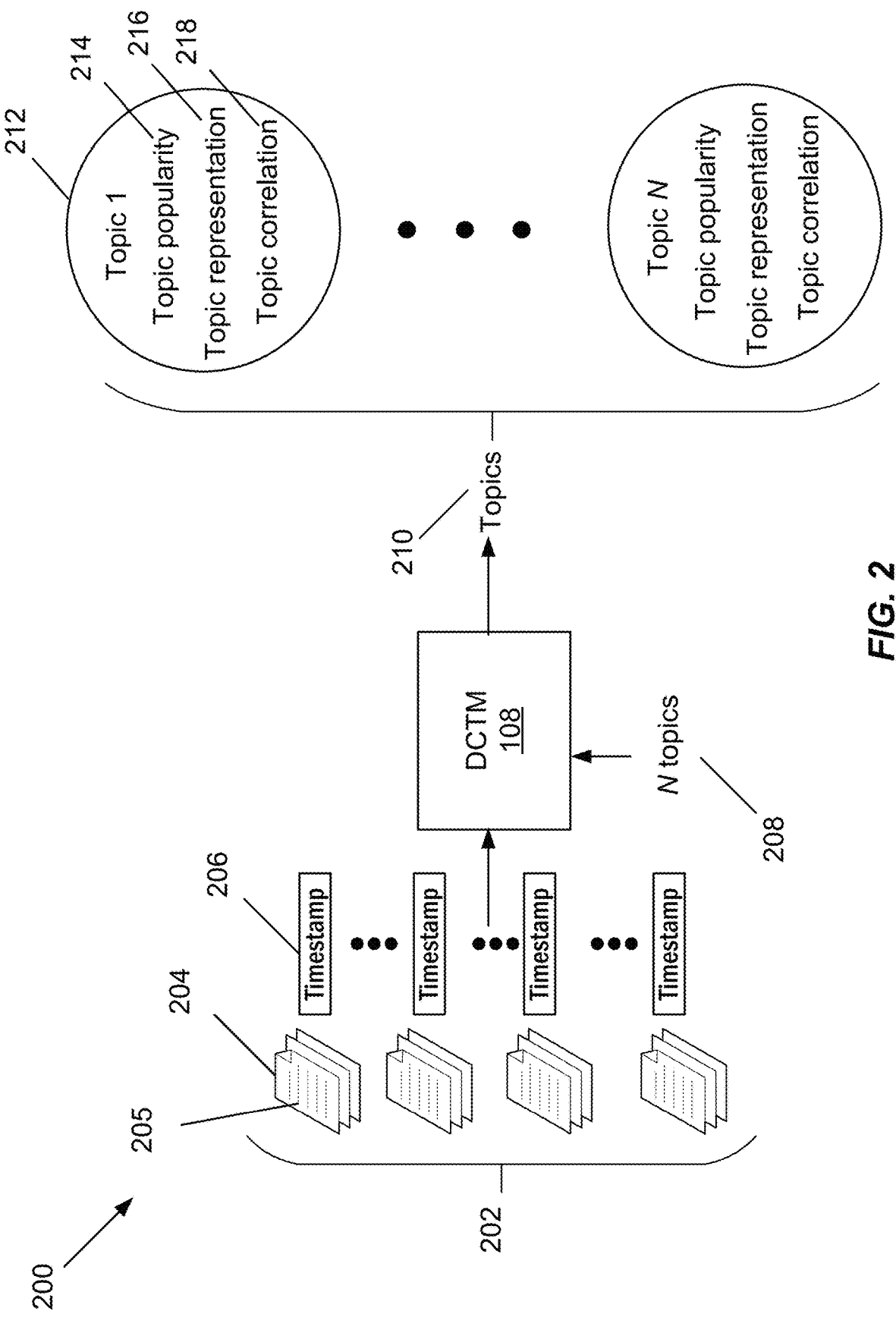
FIG. 2 illustrates example inputs and outputs to the DCTM.

FIG. 2 illustrates a conceptual diagram 200 of example inputs to and outputs from the DCTM 108. As one example, the inputs to the DCTM 108 include a set 202 of documents 204 and a quantity of topics 208 (e.g., N topics) for modeling. Each document 204 is a textual document comprised of a plurality of words 205 and having an associated timestamp 206, the timestamps 206 defining a period of time that the set 202 of documents 204 spans. In some examples, more than one document 204 can be associated with a same timestamp 206. A level of granularity at which the timestamp 206 is processed (e.g., by year, by month, by week, daily, hourly, etc.) can be variable depending on a type of document 204. The granularity can also be based on how rapidly topic popularity, topic representations, and topic correlations are likely to change. For example, if change is more likely, processing the documents 204 with smaller timestamp intervals (e.g., monthly versus yearly) can be desirable.

A topic is a probability distribution over vocabulary. Here, the vocabulary are the words 205 of the documents 204. Thus, the topics identified by the DCTM 108 are each a cluster or grouping of a subset of the words 205, as illustrated and described in greater detail with reference to FIG. 4. The topics are not assumed to be independent of one another. Accordingly, two or more topics can be represented by common words (e.g., a same word can represent more than one topic).

The quantity of topics 208 received as input informs the DCTM 108 of a number of word clusters to identify. Depending on the quantity of topics 208 provided as input and a number of topics that can be drawn from the set 202 of documents 204, a list of topics 210 output by the DCTM 108 can include all topics inferred or the N most probable topics for the documents 204 where N corresponds to the quantity of topics 208. As the topics are clusters of the words 205, in some examples, the most probable words associated with a topic are provided as the topic within the list of topics 210.

Additionally, for each topic 212 in the list of topics 210 (e.g., for each topic 1 through topic N), the DCTM 108 can provide topic popularity 214, topic representation 216, and topic correlation 218 at given time points across the period of time that the set 202 of documents 204 span to illustrate how the popularity, representations, and correlations among topics have evolved over time for the set 202.

As described in more detail with reference to FIG. 5, the topic popularity 214 can be based on document-topic distribution output by the DCTM 108. A document-topic distribution is a distribution over the topics for each document 204. For example, a document is comprised of x % of topic 1, y % of topic 2, z % of topic 3, etc., where the sum of the percentages for each topic equals 1. As described in more detail with reference to FIG. 6, the topic representation 216 can be based on topic-word distribution output by the DCTM 108. A topic-word distribution is a distribution over the words for a given topic. For example, the distribution can include the most frequently associated words with the given topic. As described in more detail with reference to FIG. 7, the topic correlation 218 is a relationship strength between a topic and one or more other topics at a given point in time, which captures the evolution of topic correlations over time. The topic correlation 218 can be based on covariance matrices that yield a correlation coefficient measuring the relationship strength.

Figure 3:
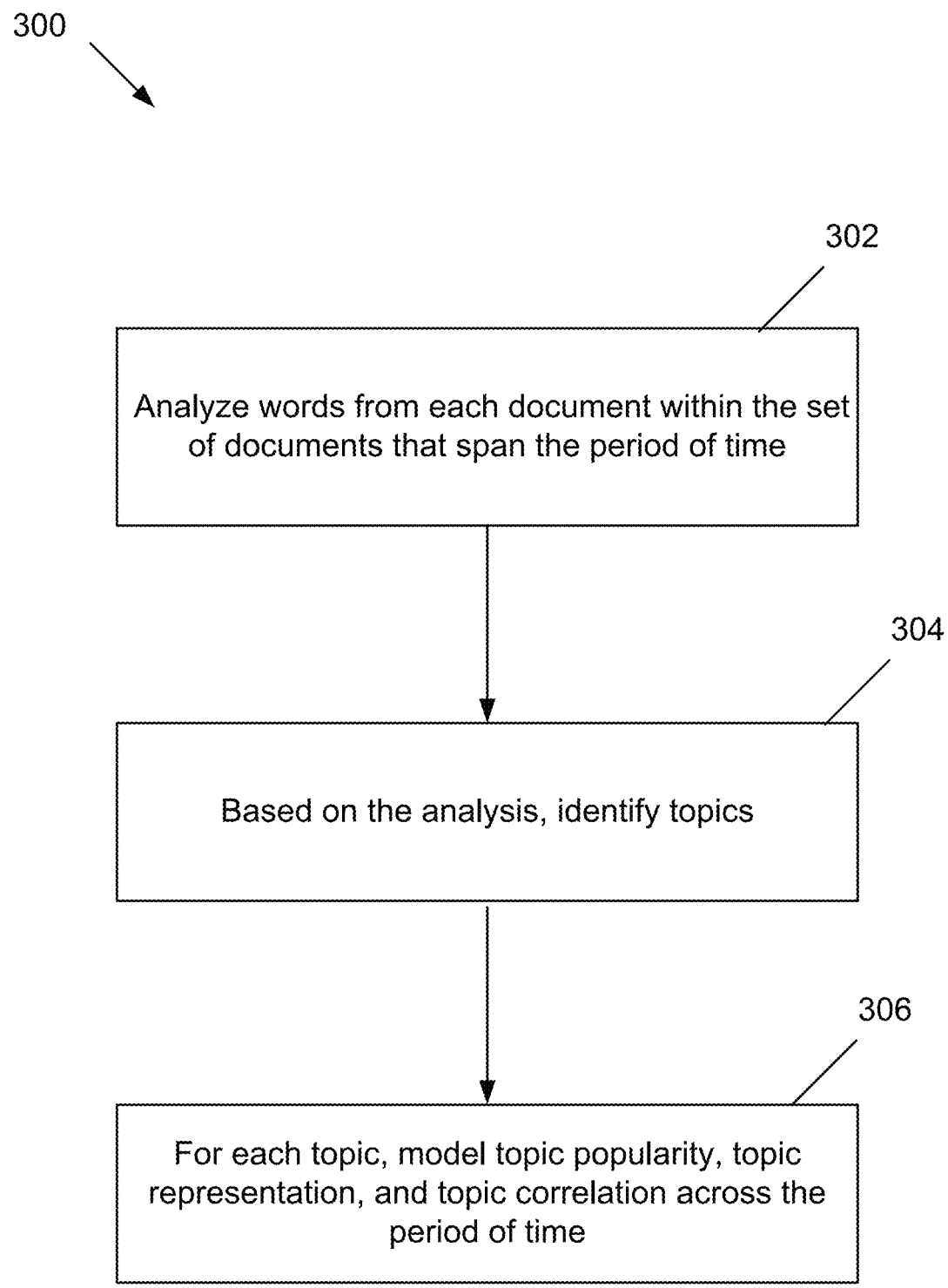
FIG. 3 is an example method of processing performed by the DCTM.

FIG. 3 is an example method 300 of processing performed by the DCTM 108. Upon receipt of inputs, such as the set 202 of documents 204 and quantity of topics 208 for modeling described with reference to FIG. 2, the DCTM 108 initiates the method 300 at operation 302 by analyzing words from each document 204 with the set 202 of documents 204. Based on the analysis, the DCTM 108 identifies topics at operation 304. The topics identified are for the set 202 of documents 204. The topics are comprised of clusters of words that represent the topics. At operation 306, for each topic identified at operation 304, the DCTM 108 models topic popularity, topic representation, and topic correlation across the period of time, as described in more detail with reference to FIG. 9. In some examples, the DCTM 108 is an unsupervised machine learning model that performs one or more of operations 304, 304, and 306 iteratively to learn the underlying topics and dynamics of each topic over time as part of training, for example. The DCTM 108 can be trained on at least a portion of the set 202 of documents 204 provided as inputs.

Figure 4:
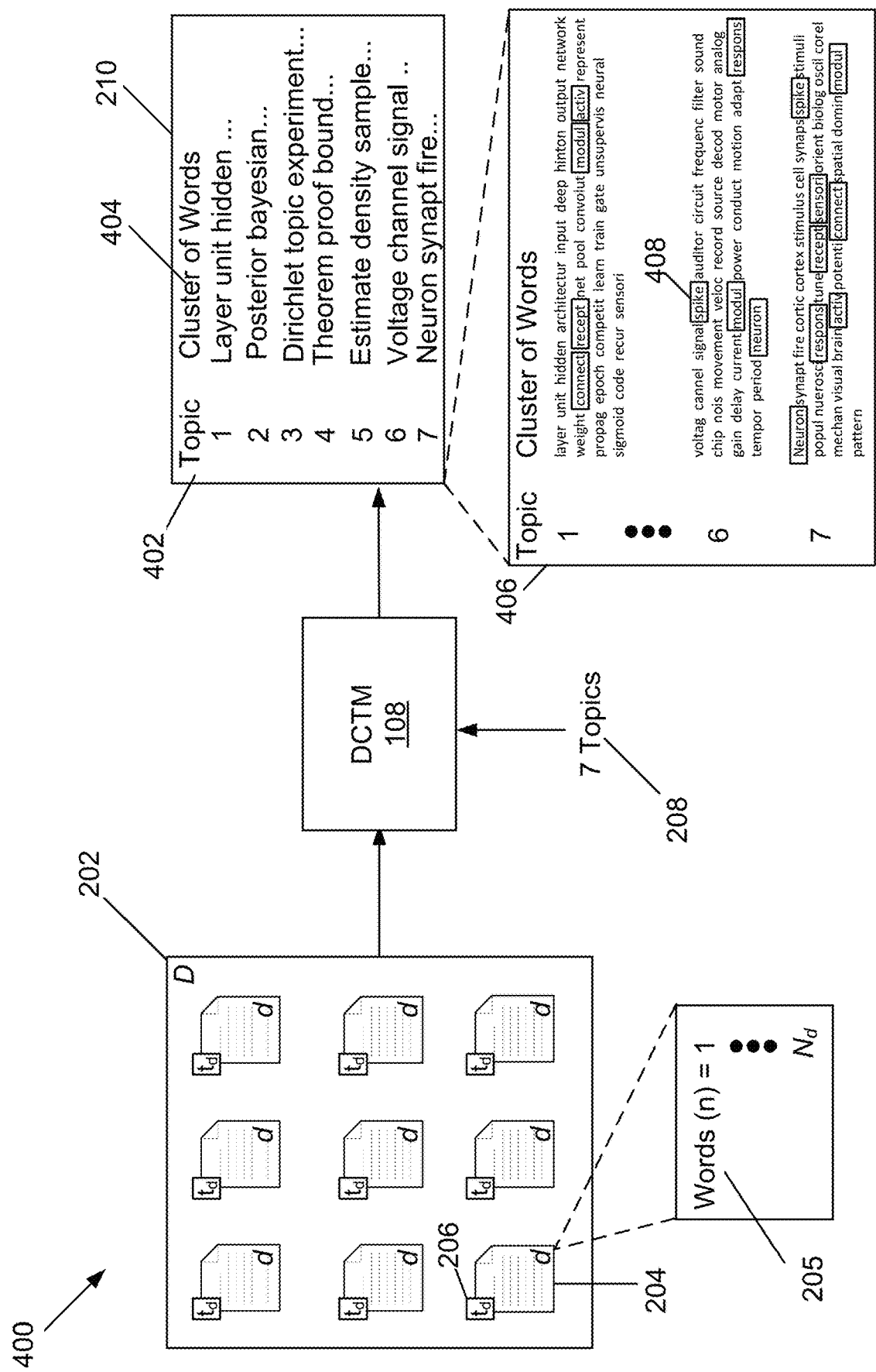
FIG. 4 illustrates a list of topics output by the DCTM.

FIG. 4 is a conceptual diagram 400 that illustrates the list of topics 210 output by the DCTM 108. In FIG. 4, a non-limiting example scenario is presented where the set 202 (D) of documents 204 (d) provided as input to the DCTM 108 are a set of conference papers related to a neural information processing systems conference, and the quantity of topics 208 provided as input to the DCTM 108 is 7 topics. The set of conference papers includes 5,804 conference papers from each year the conference was held spanning from 1987 to 2015, with an average of about 34 papers per year. Each conference paper is comprised of a plurality of words 205 (e.g., $N_d$ words). Each conference paper is also associated with a timestamp 206 ($t_d$) reflecting the year that the paper was published. For example, the about 34 papers published for the 1987 conference are associated with 1987 via the timestamp 206.

The list of topics 210 provided as output of the DCTM 108 includes 7 topics (e.g., topics 1 through 7) corresponding to the quantity of topics 208 provided as input. As illustrated, the topics 402 are represented by clusters 404 of the plurality of words 205. For example, as shown in a blown up representation 406 the list of topics 210, a top thirty most probable words associated with topics 1, 6 and 7 are displayed. The topics 402 are not assumed to be independent from one another. Accordingly, two or more topics can have common words 408, as illustrated by the common words 408 associated with at least two of the topics 1, 6, and 7 that are highlighted in the blown up representation 406. The DCTM 108 is robust enough to discriminate between the topics 402 that share common words 304, and is also able to consider multiple topics with similar interpretation, such as topics 6 and 7, and split facets of a single topic into more than one topic. Additionally, as described in greater detail below in FIG. 7, the presence of common words 408 among the topics 1, 6, and 7 can indicate a positive correlation between each of the topics.

In some examples, the topics can later be labeled or categorized based on a general subject matter reflected by the words. As one example, the topic 1 can be labeled or categorized as neural networks. As another example, topics 6 and 7 can be labeled or categorized as neuroscience.

Figure 5:
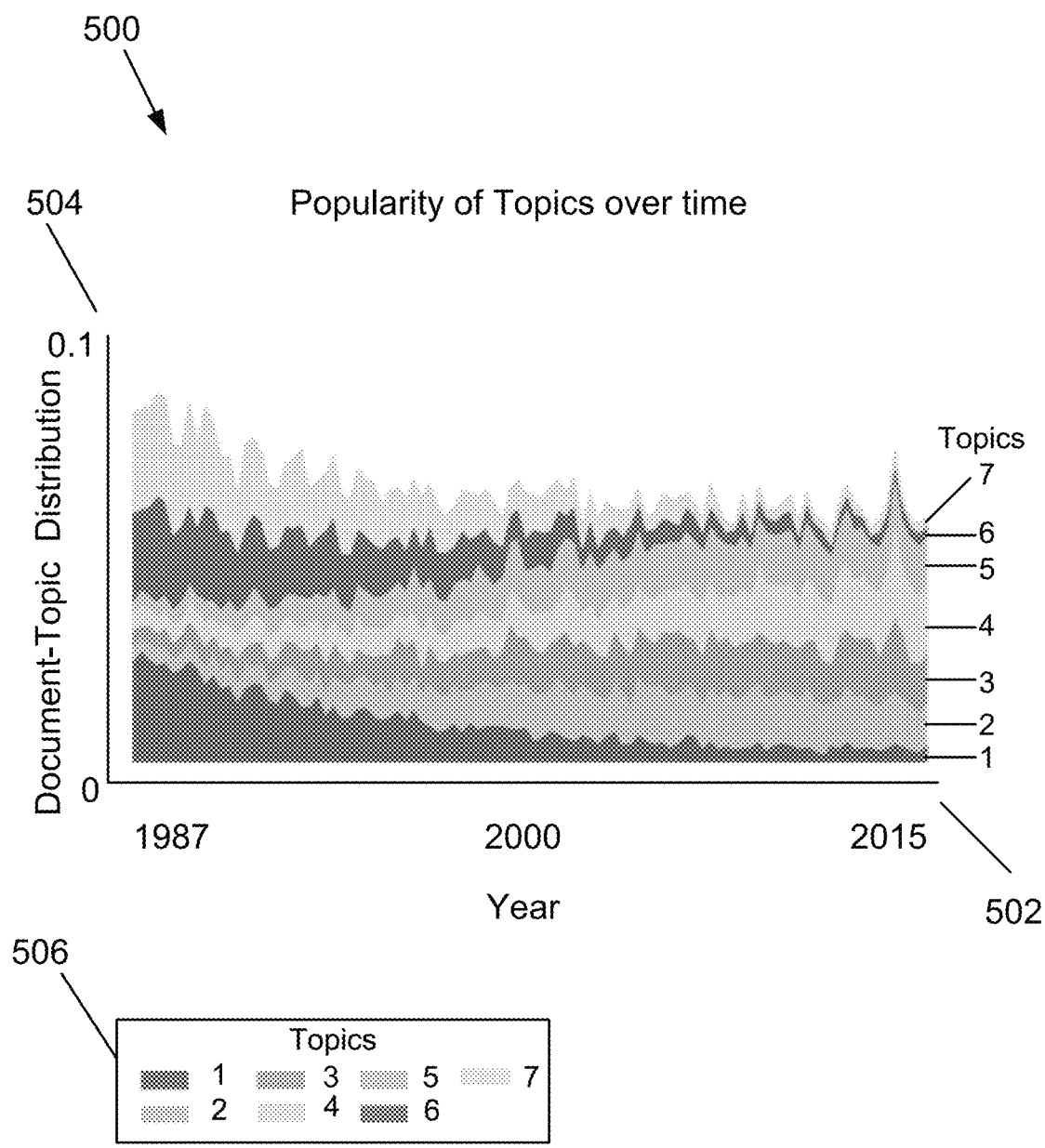
FIG. 5 is an example graph depicting an evolution of topic popularity.
Figure 6:
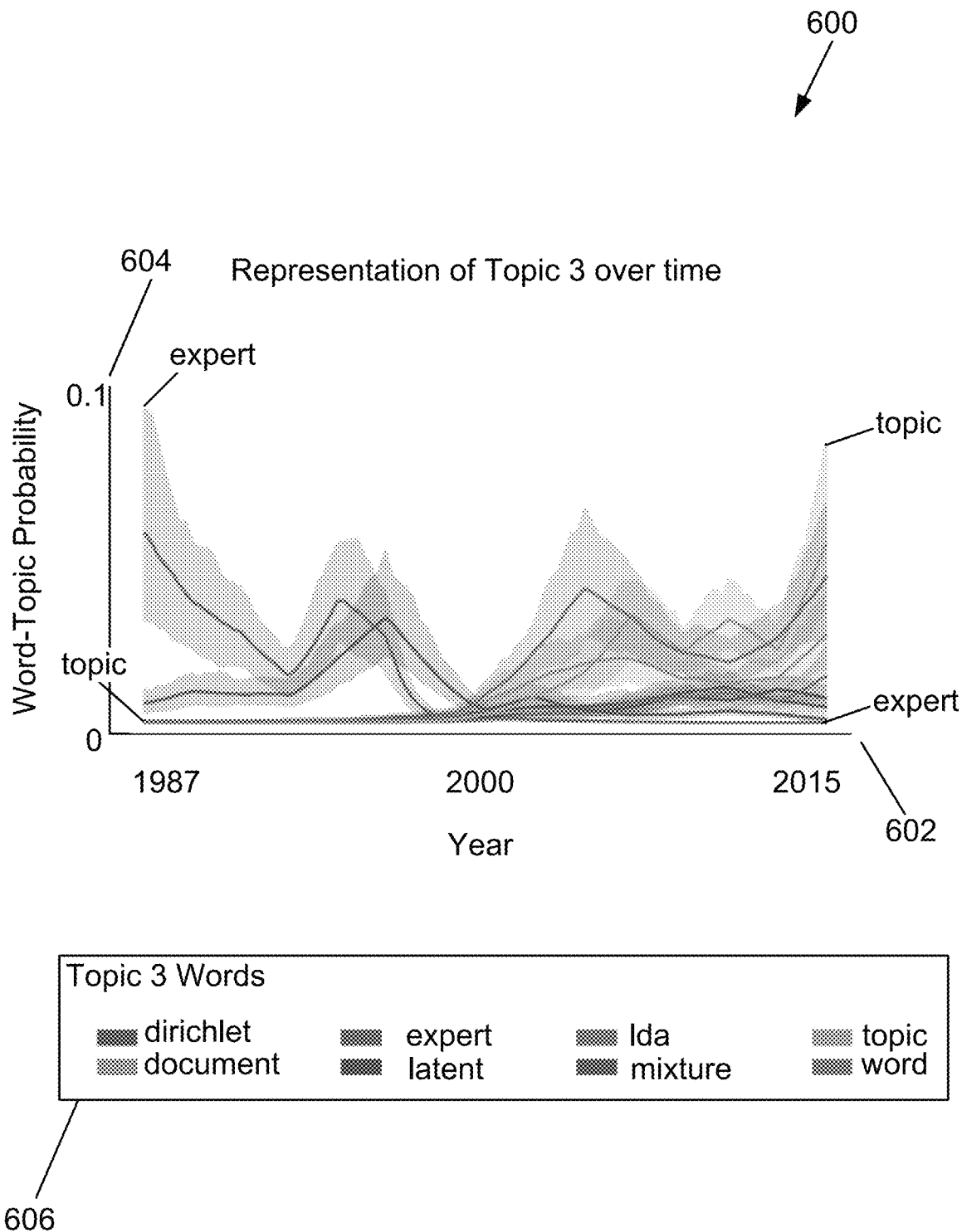
FIG. 6 is an example graph depicting an evolution of topic representation.
Figure 7:
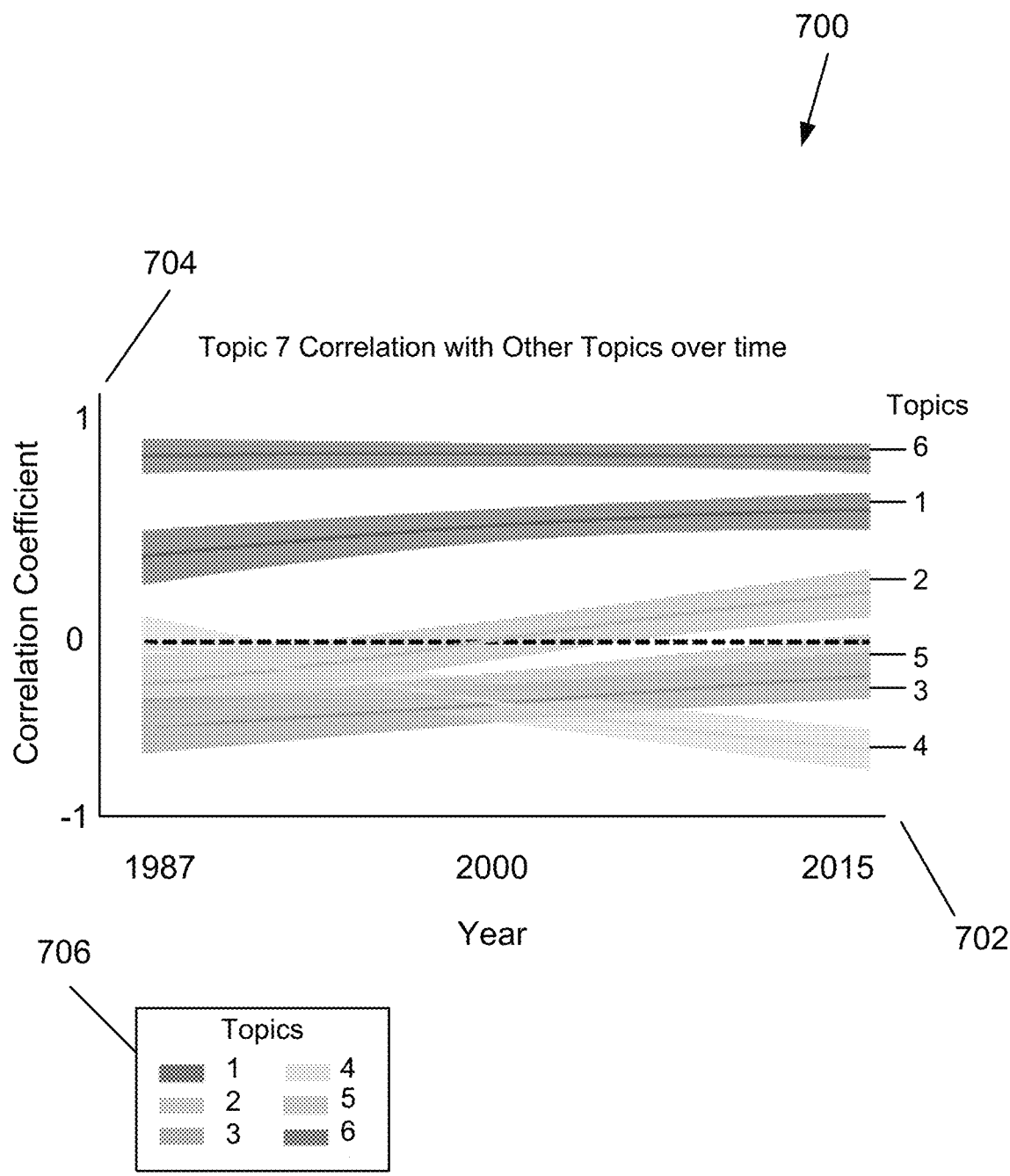
FIG. 7 is an example graph depicting an evolution of topic correlations.

The conference paper dataset scenario presented in FIG. 4 is continued in FIGS. 5, 6, and 7 to depict examples of the additional outputs of the DCTM 108, including topic popularity, topic representation, and topic correlation for the topics 402 in the list 210 across the period of time spanned by the set 202 of documents 204.

FIG. 5 is an example graph 500 depicting an evolution of topic popularity. An x-axis 502 of the graph 500 represents time, particularly each year spanning from 1987 to 2015 (e.g., the timeframe for the conference paper data set). A y-axis 504 of the graph 500 represents a document-topic distribution at given time points across the period of time. Specifically, the y-axis 504 can represent a mean of the document-topic distribution (e.g., $\sigma(\eta_d)$), described in more detail with reference to FIG. 9 below, for each document at a given time point yielded by the DCTM 108.

A document-topic distribution is a distribution over the topics for a document. An example distribution over the topics for a document at a given time point is as follows: x % of topic 1, y % of topic 2, z % of topic 3, etc., where the sum of the percentages for each topic equals 100%. For example, as shown in the graph 500, for a document from 1987, the document-topic distribution is likely to be 8% topic 7, 6% topic 6, 4% topic 5, and so on. A legend 506 indicates a visual scheme to distinguish a proportion of the document that each of the topics 1 through 7 make up as part of the document-topic distribution. For additional clarity, the corresponding data may also be labeled with each of the topics within the graph 500, as illustrated.

As illustrated by the graph 500, a distribution for each of the topics 1, 6 and 7 has generally decreased as time has progressed from 1987 to 2015. This decrease in distribution corresponds to a decrease in trends or decrease in popularity for these topics within conference papers related to neural information processing systems.

FIG. 6 is an example graph 600 depicting an evolution of topic representation. An x-axis 602 of the graph 600 represents time, particularly each year spanning from 1987 to 2015 (e.g., the timeframe for the conference paper dataset). A y-axis 604 of the graph 600 represents a word-topic probability for a given word being associated with a given topic (e.g., topic 3) at a given year. The word-topic probability is computed based on a distribution over the words for the given topic (e.g., the topic-word distribution output by the DCTM 108 that is derived from β as described with reference to FIG. 9 below). For example, the cluster of words that represents the given topic includes words associated with the topic accounting for an entirety of the time period across all documents (e.g., words that represent the topics from 1987 to 2015 shared by all documents). The word-topic probability is a likelihood that a given word from that cluster represents the given topic at the given year. The word-topic probability is a value from 0 to 1, where 0 indicates no likelihood, and 1 indicates a certain likelihood. The $50^{th}$ percentile is shown in the solid line, with the credible interval between the $5^{th}$ and $95^{th}$ percentile shown in the shaded areas. A legend 606 indicates a visual scheme to distinguish the word-topic probability for each of a subset of words that represent a given topic (e.g., topic 3) within the list of topics described with reference to FIG. 3.

As illustrated in FIG. 6, the graph 600 may depict an evolution of topic representation for topic 3 that shows how the most probable words that are associated with topic 3 have changed over time. Topic 3 generally relates to topic modeling. The subset of most probable words displayed include dirichlet, expert, lda, topic, document, latent, mixture, and word. While the distribution of topic 3 remains relatively stable over time as shown in FIG. 4, the words associated with topic 3 change drastically over time as shown in FIG. 5. In other words, while topic 3 will consistently make up about 2-3% of a document at any given year from 1987 to 2015, the words that the document will include that are associated with topic 3 drastically change from 1987 to 2015. For example, shortly after 2000, words including topic became increasingly associated with topic 3, whereas words that were previously associated with topic 3, such as expert, generally declined to a word-topic probability of 0. For additional clarity, labels are included within the graph 600 to indicate the word-topic probability corresponding to expert and topic in 1987 and 2015, respectively.

FIG. 7 depicts an example graph 700 depicting an evolution of topic correlation. An x-axis 702 of the graph 700 represents time, particularly each year spanning from 1987 to 2015 (e.g., the timeframe for the conference paper dataset). A y-axis 704 of the graph 700 represents a correlation coefficient measuring a correlation strength of a respective topic (e.g., topic 7) with another given topic at a given year. The correlation coefficient can be computed based on covariance matrices (Σ) dynamically modeled by the DCTM 108, as described in greater detail with reference to FIG. 9. The correlation coefficient is a value from −1 to 1, where a value of −1 indicates that there is a perfect negative correlation between two topics, a value of 0 indicates that there is no linear relationship between the two topics, and a value of 1 indicates there is a perfect positive correlation. The $50^{th}$ percentile is shown in the solid line, with the credible interval between the $5^{th}$ and $95^{th}$ percentile shown in the shaded areas. A legend 706 indicates a visual scheme to distinguish the correlation between topic 7 and each of topics 1 through 6 within the list of topics described with reference to FIG. 4. For additional clarity, the corresponding data may also be labeled with each of the topics within the graph 700, as illustrated.

As illustrated in FIG. 7, the graph 700 may depict an evolution of topic correlation for topic 7 that shows how its relationship with other topics have changed over time. Topic 7 can be labeled as relating to neuroscience. Topic 7 exhibits a positive correlation with topic 6 (also relating to neuroscience) that has been consistent over time, as well as an increasing positive correlation with topic 1 relating to neural networks from 1987 to 2015. Topic 7 otherwise exhibits small or close to 0 correlations or negative correlations with the remaining topics 2, 3, 4, and 5.

Figure 8:
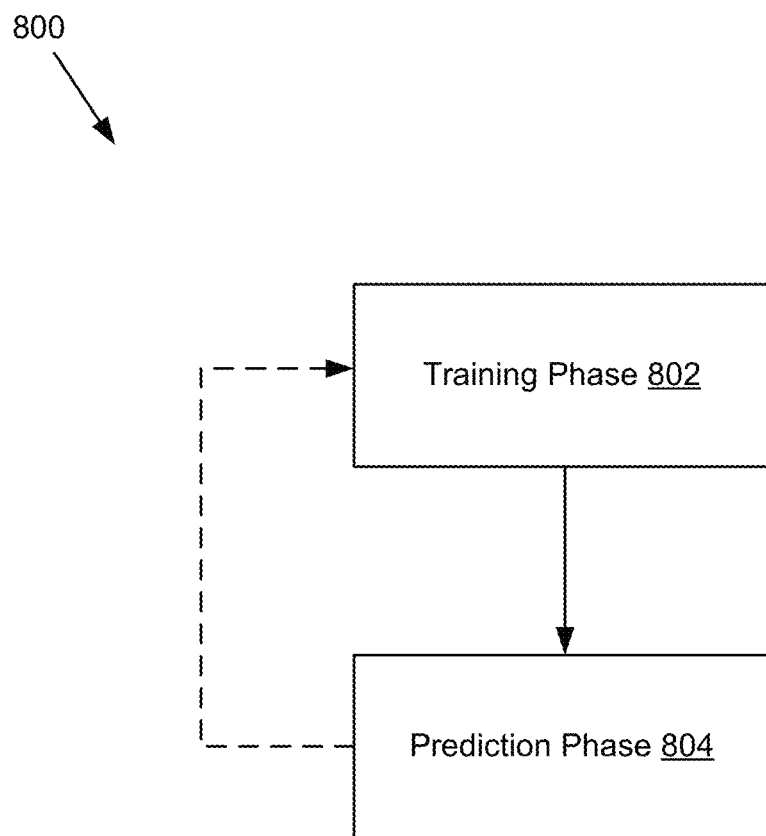
FIG. 8 is a conceptual diagram illustrating example phases of the DCTM.

FIG. 8 is a conceptual diagram 800 illustrating example phases of the DCTM 108. The example phases include a training phase 802 described in detail with respect to FIG. 9, and a prediction phase 804 described in detail with respect to FIG. 10. For example, DCTM 108 may first be trained during the training phase 802 using a training dataset (e.g., a set of documents) to learn latent variables and parameters in order to estimate distribution over the topics for each document in the set and distribution over words for each topic. Once sufficiently trained, the DCTM 108 can then be used to predict a distribution over the topics for a new document in the prediction phase 804. In some embodiments, feedback based on the predictions output by the DCTM 108 during the prediction phase 804 may be used to further train the DCTM 108.

Figure 9:
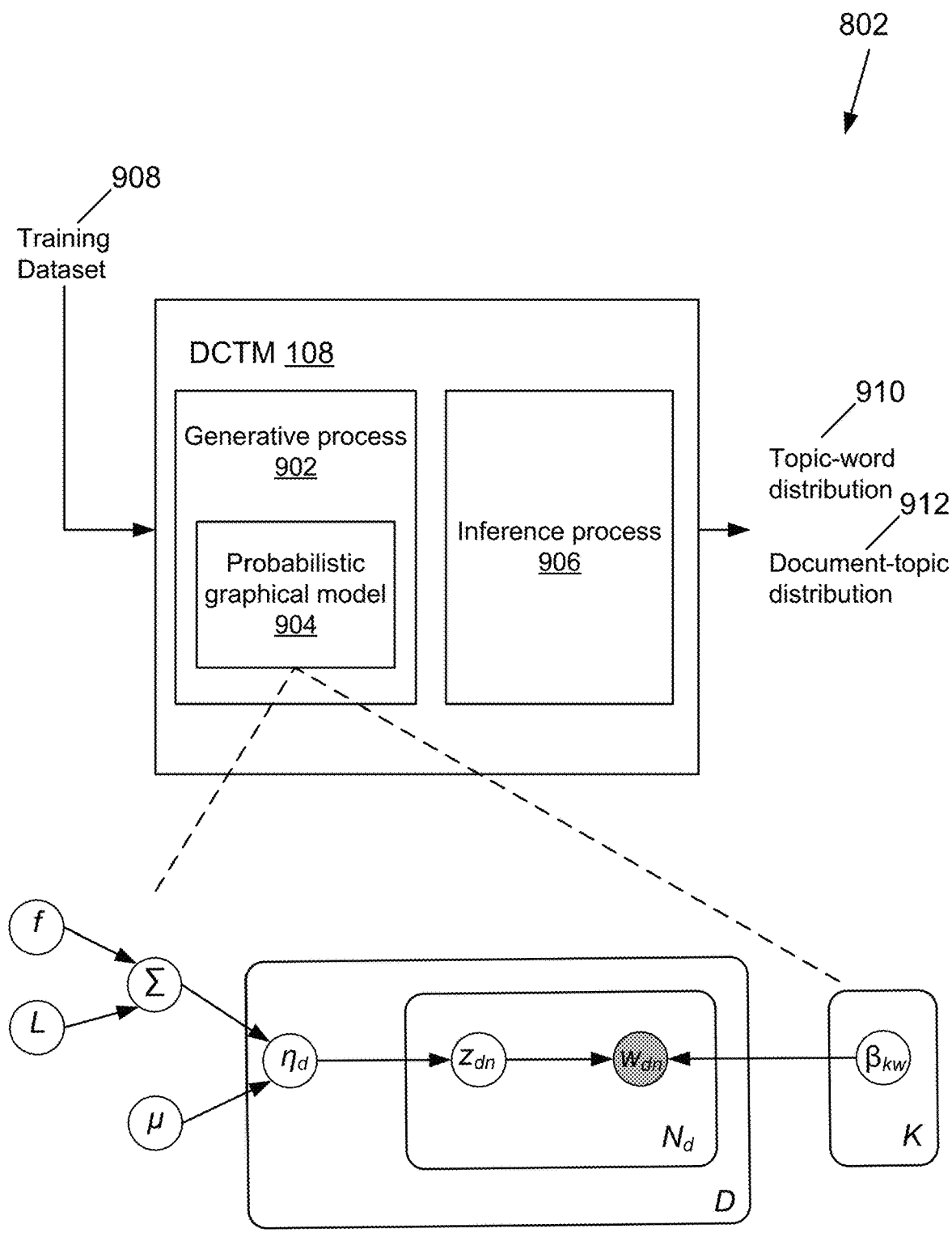
FIG. 9 illustrates an example training phase of the DCTM.

FIG. 9 illustrates an example training phase 802 of the DCTM 108. During the training phase 802, the DCTM 108 performs a generative process 902 and an inference process 906 using a training dataset 908. In some examples, the architecture of the DCTM 108 includes one or more deep neural networks utilizing unsupervised learning techniques to perform one or more of the generative process 902 and an inference process 906. The training can occur online (e.g., over a network such as network 120 described with reference to FIG. 1).

The generative process 902 defines a joint probability distribution over observed data and latent variables. The joint probability distribution can be decomposed into a likelihood for the observed data conditioned on the latent variables and a prior distribution from which the latent variables are drawn. In some examples, a probabilistic graphical model 904 is used to illustrate the generative process 902. For example, within the probabilistic graphical model 703, the shaded node represents the observed data, the unshaded nodes represent the latent variables, and the edges represent possible dependencies between the nodes. A goal of the training phase is to learn the latent variables and model parameters. In some examples, at least a portion of the training dataset 908 is held back to be used for testing. For example, 75% of the dataset can be used for training, and 25% can be withheld as a testing dataset.

Here, as illustrated by the probabilistic graphical model 904, the observed data is a word ($w_{dn}$), which is an $n^{th}$ word of a $d^{th}$ document (e.g., the document d having $N_d$ words) in a set of documents D comprising a corpus W. Corpus W is the training dataset 908. The latent variables, each described in greater detail below, include: distributions of words for topics (β), a topic assignment ($z_{dn}$) drawn from a mixture of topics ($\eta_d$) over the corpus W, the mixture of topics ($\eta_d$) being dependent on a mean of the prior distribution of document-topic proportion (e.g., topic probability) (μ) and co-variance matrices (Σ), the co-variance matrices (Σ) drawn from a plurality of Gaussian processes generated independent of one another (f) and a correlation between the Gaussian processes driven by (L).

The set of documents D comprising the corpus W are associated with one or more evolving indexes. Here, the set of documents D are associated with a single index of time (e.g., indicated by timestamps $t_d$ associated with one or more documents d in the set of documents D). However, in other examples, the index can alternatively or additionally include a geographical location. Taking into account the temporal dynamics underlying the documents d in the training dataset 908, the DCTM 108 learns the latent variables and model parameters during the training phase 802 to infer a topic-word distribution 910 for each topic and a document-topic distribution 912. The topic-word distributions 910 include words that are most frequently associated with each of the topics, which can be determined based on $\beta$. The document-topic distribution 912 includes a proportion of each document d within the corpus W that is associated with each of the topics, which can be determined based on $\mu$ and $\Sigma$. Continuous processes are utilized for modeling to enable incorporation of the temporal dynamics into the DCTM 108. For example, as described in greater detail below, to incorporate temporal dynamics for each component of the DCTM 108, Gaussian processes (GP) are used to model $\beta$ and $\mu$ and a generalized Wishart process (GWP) is used to model $\Sigma$.

The generative process 902 depicts how the variables and model parameters are learned. For example, the DCTM 108 assumes that a document d having a word count $N_d$ at time $t_d$ is generated according to the generative process 902, described as follows. A mixture of topics $\eta_d \cdot \mathcal{N}(\mu_{t_d}, \Sigma_{t_d})$ is drawn. Then, for each word n=1, ..., $N_d$: a topic assignment $z_n | \eta_d$ is drawn from a multinomial distribution with the parameter $\sigma(\eta_d)$, and a word $w_n | z_n, \beta$ is drawn from a multinomial distribution with the parameter $\sigma(\beta_{z_n})$, where $\sigma$ represents a softmax function. An example softmax function is as follows: $\sigma(z)_i = e^{z_i} \Sigma_{j=1}^K e^{z_j}$. Transformation using the softmax function, also referred to herein as the softmax transformation, is used for both $\eta_d$ and $\beta z_n$ because each are assumed to be defined in an unconstrained space. The softmax transformation converts the parameters to probabilities to encode the proportion of topics for a document and the distribution of the words for a topic, respectively.

Under the above-described generative process 902, the marginal likelihood for the corpus W of documents becomes:

$$p(W | \mu, \Sigma, \beta) = \prod_{d=1}^{D} \int \left( \sum_{z_n=1}^{k} p(W_d | z_n, \beta_{t_d}) p(z_n | \eta_d) \right) p(\eta_d | \mu_{t_d}, \Sigma_{t_d}) d\eta_d. \quad (1)$$

The individual documents of the set W are assumed to be independent and identically distributed (i.i.d) given the document-topic proportion and word-topic distribution.

In traditional correlated topic models (CTMs), the parameterization of $\eta$ is relaxed by allowing topics to be correlated with each other (e.g., by allowing a non-diagonal $\Theta_{t_d}$). For examples, a logistic normal distribution can be used to model $\eta$ to allow the probability of the topics to be correlated with each other. However, particularly over a long period of time, the correlations among the topics are not likely to remain constant. Intuitively, the degree of correlation among topics changes over time, as the correlation simply reflects the co-occurrence of the concepts appearing in documents. Therefore, the dynamics of the covariance matrices ($\Sigma$) of the topics from which correlations can be derived are modeled, extending the capabilities of the traditional CTMs. The dynamics of $\mu$ and $\beta$ are modeled in addition to the dynamics of $\Sigma$ to enable evolutionary modeling of document topic distribution 912 and topic word distribution 910 (and thus topic popularity and topic representation respectively), along with dynamic correlations over time.

To model the dynamics, the topic probability $(\mu_{t_d})_{d=1}^D$ and the distributions of words for topics $(\beta_{t_d})_{d=1}^D$ are modeled as zero-mean Gausian processes (e.g., $p(\mu) = \mathcal{GP}(0, \kappa_\mu)$ and $p(\beta) = \mathcal{GP}(0, \kappa_\beta)$). In some examples, a squared exponential kernel can be used for $\mu$ and a Matern kernel with parameter ½ can be used for $\beta$. The squared exponential kernel allows more freedom for topic probability to change rapidly. The series of co-variance matrices $(\Sigma_{t_d})_{d=1}^D$ are modeled using a generalized Wishart process, which is a generalization of Gaussian processes to positive semi-definite matrices. The generalized Wishart process is constructed from the independent and identically distributed (i.i.d.) collections of Gaussian processes as follows. Let $$f_{di} \sim \mathcal{GP}(0, \kappa_\theta), \, d \leq D, \, i \leq \nu \quad (2)$$

be D×ν i.i.d. Gaussian processes with zero mean function and (shared) kernel function $\kappa_\theta$, where $\theta$ denotes any parameters of the kernel function. For example, in the case of $\theta = \theta_1^2 * \exp(-\|x-y\|^2/(2*\theta_2^2))$, $\theta = (\theta_1, \theta_2)$ corresponds to the amplitude and length scale of the kernel (assumed to be independent from one another). In some examples, a squared exponential kernel can be used for $\Sigma$ to allow more freedom for topic correlations to change rapidly. The amplitude and length scale of kernels can be initialed as 1 and 0.1 respectively, which can then be learned using an approximate empirical Bayes approach.

The positive integer-valued $\nu \geq D$ is denoted as the degrees of freedom parameter. Let $F_{ndk} := f_{dk}(x_n)$, and let $F_n := (F_{ndk}, d \leq D, k \leq \nu)$ denote the D×ν matrix of collected function values, for every $n \geq 1$. Then, consider $$\Sigma_n = LF_n F_n^T L^T, \, n \geq 1, \quad (3)$$

where $L \in \mathbb{R}^{D \times D}$ satisfies the condition that the symmetric matrix $LL^T$ is positive definite. With such construction, $\Sigma_n$ is (marginally) Wishart distributed, and $\Sigma$ is correspondingly called a Wishart process with degrees of freedom $\nu$ and scale matrix $V = LL^T$. We denote $\Sigma_n \sim \mathcal{GWP}(V, \nu, \kappa_\theta)$ to indicate that $\Sigma_n$ is drawn from a Wishart process. The dynamics of the process of the covariance matrices $\Sigma$ are inherited by the Gaussian processes, controlled by the kernel function ice. With this formulation, the dependency between D Gaussian processes is static over time, and regulated by the matrix V.

L is a triangular Cholesky factor of the positive definite matrix V, with M=D(D+1)/2 free elements. Each of the free elements can be vectorized into a vector $\ell = (\ell_1, \ldots, \ell_m)$ and assigned a spherical normal distribution $p(\ell_m) = \mathcal{N}(0, 1)$, where the diagonal elements of L are positive. To ensure that the diagonal elements of L are positive, a change of variables can be applied to the prior distribution of the diagonal elements by applying a soft-plus transformation $\ell = \log(1 + \exp(\hat{\ell}_i)), \hat{\ell}_i \sim \mathcal{N}(0,1))$.

Stochastic gradient estimation with discrete latent variables is difficult, and often results in significantly higher variance in gradient estimation even with state-of-the-art variance reduction techniques. To simplify stochastic gradient estimation, the discrete latent variables in the DCTM 108 can be marginalized out in closed form. For example, the resulting marginalized distribution $p(W_d|z_n, \beta_{t_d})$ becomes a multinomial distribution over the word count in each document, $$W_d \sim \Pi_{n=1}^{N_d} \text{Multinomial}(1, \sigma(\beta_{t_d} \eta_d)). \quad (4)$$

As discussed above, the generative process 902 defines a joint probability distribution over observed data and latent variables that can be decomposed into a likelihood for the observed data conditioned on the latent variables and a prior distribution from which the latent variables are drawn.

The inference process 906 parametrizes the approximate posterior of the latent variables using variational inference techniques. For example, variational lower bounds are individually derived for the following variables (e.g., components of the DCTM 108): $\eta_d, \beta, \mu$, and $\Sigma$, the derivation processes for each discussed in turn below. Once derived, the individually derived lower bounds of the components can be assembled together for a stochastic variational inference (SVI) method for the DCTM 108.

The SVI method for the DCTM 108 enables mini-batch training over the documents in the training dataset 908. This is facilitated by the use of amortized inference to derive the variational lower bound of $\eta_d$. After defining a variational posterior $q(\eta_d)$ for each document, a variational lower bound of the log probability over the documents, denoted as $\mathcal{L}_W$ and also referred to as lower bound $\mathcal{L}_W$, can be derived as follows, $$\text{Log } p(W | \mu, \Sigma, \beta) \geq \quad (5)$$
$$\sum_{d=1}^{D} \int q(\eta_d) \log \frac{p(W_d | \eta_d, \beta_{t_d}) p(\eta_d | \mu_{t_d}, \Sigma_{t_d})}{q(\eta_d)} d\eta_d =$$
$$\sum_{d=1}^{D} (\mathbb{E}_{q(\eta_d)}[\log p(W_d | \eta_d, \beta_{t_d})] - KL(q(\eta_d) \| p(\eta_d | \mu_{t_d}, \Sigma_{t_d}))).$$

As the lower bound $\mathcal{L}_W$ is a summation over individual documents, it is straight-forward to derive a stochastic approximation of the summation by sub-sampling the documents, $$\mathcal{L}_W \approx \quad (6)$$
$$\frac{D}{B} \sum_{i \in \mathcal{D}_B} (\mathbb{E}_{q(\eta_d)}[\log p(W_d | \eta_d, \beta_{t_d})] - KL(q(\eta_d) \| p(\eta_d | \mu_{t_d}, \Sigma_{t_d}))),$$

where $\mathcal{D}_B$ is a random sub-sampling of the document indices with the size $B$. The above data sub-sampling enables performance of mini-batch training, where the gradients of the variational parameters are stochastically approximated from a mini-batch. An issue with the above data sub-sampling is that only the variational parameters associated with the mini-batch get updated, which causes synchronization issues when running stochastic gradient descent. To avoid this, it is assumed the variational posteriors $q(\eta_d)$ for individual documents are generated according to parametric functions, $$q(\eta_d) = \mathcal{N}(\phi_m(W_d), \phi_S(W_d)), \quad (7)$$

where $\phi_m$ and $\phi_S$ are the parametric functions that generate the mean and variance of $q(\eta_d)$, respectively. This is referred to as amortized inference. With this parameterization of the variational posteriors, a common set of parameters can be updated no matter which documents are sampled into the mini-batch, thus overcoming the synchronization issue.

The lower bound $\mathcal{L}_W$ cannot be computed analytically. Instead, an unbiased estimate of $\mathcal{L}_W$ is computed using Monte Carlo sampling. As $q(\eta_d)$ are normal distributions, a low-variance estimate of the gradients of the variational parameters are obtained via the reparameterization strategy.

Both of the word distributions of topics ($\beta$) and the mean of the prior distribution of the document-topic proportion ($\mu$), also referred to as topic probability, follow Gaussian processes that take the time stamps of individual documents as inputs, i.e., $p(\beta|t)$ and $p(\mu|t)$. A stochastic variational Gaussian process approach can be used to construct the variational lower bound of $\beta$ and $\mu$.

For examples, each Gaussian process can be augmented with a set of auxiliary variables with a set of corresponding time stamps, i.e., $$p(\beta|t) = \int p(\beta|U_\beta, t, z_\beta) p(U_\beta|z_\beta) dU_\beta \quad (8)$$

$$p(\mu|t) = \int p(\mu|U_\mu, t, z_\mu) p(U_\mu|z_\mu) dU_\mu \quad (9)$$

where $U_\beta$ and $U_\mu$ are the auxiliary variables for $\beta$ and $\mu$, respectively, and $z_\beta$ and $z_\mu$ are the corresponding time stamps. Both $p(\beta|U_\beta, t, z_\beta)$ and $p(U_\beta|z_\beta)$ follow a same Gaussian process as the Gaussian process for $p(\beta|t)$, each having the mean and kernel functions. Similarly, both $p(\mu|U_\mu, t, z_\beta)$ and $p(U_\beta|z_\beta)$ follow a same Gaussian process as the Gaussian process for $p(\mu|t)$, each having the mean and kernel functions. Despite the augmentation, the prior distributions for $\beta$ and $\mu$ are not changed.

Variational posteriors of $\beta$ and $\mu$ are constructed in the following form: $q(\beta, U_\beta) = p(\beta|U_\beta) q(U_\beta)$ and $q(\mu, U_\mu) = p(\mu|U_\mu) q(U_\mu)$. Both $q(U_\beta)$ and $q(U_\mu)$ are multivariate normal distributions in which the mean and covariance are variational parameters. For example, $q(U_\beta) = \mathcal{N}(M_\beta, S_\beta)$ and $q(U_\mu) = \mathcal{N}(M_\mu, S_\mu)$. When $\beta$ and $\mu$ are used in down-stream distributions, a lower bound can be derived, $$\log p(\cdot|\beta) \geq \mathbb{E}_{q(\beta)}[p(\cdot|\beta)] - KL(q(U_\beta) \| p(U_\beta)), \quad (10)$$

$$\log p(\cdot|\mu) \geq \mathbb{E}_{q(\mu)}[p(\cdot|\mu)] - KL(q(U_\mu) \| p(U_\mu)), \quad (11)$$

where $q(\beta) = \int p(\beta|U_\beta) q(U_\beta) dU_\beta$ and $q(\mu) = \int p(\mu|U_\mu) q(U_\mu) dU_\mu$.

As previously discussed, the generalized Wishart process for $\Sigma$ is derived from a set of Gaussian processes. At each time point, the covariance matrix is defined as $\Sigma_t = L F_t F_t^T L^T$. The vector stacking of each entry of the matrix $F_t$ across all the time points, $f_{ij} = ((F_i)_{ij}, \ldots, (F_T)_{ij})$, follows a Gaussian process $p(f_{ij}|t) = \mathcal{GP}(0, \kappa)$. A stochastic variational inference method for the Wishart Process can be derived similar to the stochastic variational inference method for Gaussian processes described with reference to $\beta$ and $\mu$. For example, each $p(f_{ij}|t)$ in the Wishart process is augmented with a set of auxiliary variables having a set of corresponding time stamps, $$p(f_{ij}|t) = \int p(f_{ij}|u_{ij}, t, z_{ij}) p(u_{ij}|z_{ij}) du_{ij}, \quad (12)$$

where $u_{ij}$ is the auxiliary variable and $z_{ij}$ is the corresponding time stamp. The variational posterior of $f_{ij}$ is defined as $q(f_{ij}, u_{ij}) = p(f_{ij}|u_{ij}) q(u_{ij})$, where $(\mu_{ij}) = \mathcal{N}(m_{ij}, s_{ij})$. We also define the variational posterior of $\ell$ to be $q(\ell) = \mathcal{N}(m_\ell, S_\ell)$, where $S$ is a diagonal matrix. A change of variable can also be applied to the variational posterior of the diagonal elements, $\ell_m = \log(1 + \exp(\hat{\ell}_m)), q(\hat{\ell}_m) = \mathcal{N}(m_{\ell_m}, S_{\ell_m})$.

With such a set of variational posterior for all the entries $\{f_{ij}\}$ and $\ell$, a variational lower bound can be derived, when $\Sigma$ is used for down-stream distributions, $$\log p(\cdot \mid \Sigma) \geq \qquad (13)$$

$$\mathbb{E}_{q(F)q(\ell)}[p(\cdot \mid \Sigma)] - \sum_{i,j} KL(q(u_{ij}) \| p(u_{ij})) - KL(q(\ell) \| p(\ell)),$$

where $q(F)=\Pi_{ij}\, q(f_{ij})$ with $q(f_{ij})=\int p(f_{ij}|u_{ij})q(u_{ij})du_{ij}$.

After deriving the variational lower bound for all the components, the lower bounds of the individual components can be assembled together for a stochastic variational inference for DCTM 108. For example, the document-topic proportion for each document d follows a prior distribution $p(\eta_d|\mu_{t_d}, \Sigma_{t_d})$, where the Gaussian process of μ provides the mean and the generalized Wishart process for Σ provides the covariance matrix at the time stamp $t_d$. The word distributions for individual topics are used in defining the distribution of individual words for each document d, $p(W_d|\eta_d, \beta_{t_d})$. Combining the lower bounds (10), (11) and (13), we can derive the complete variational lower bound $\mathcal{L}$ of DCTM 108.

$$\log p(W) \geq \mathbb{E}_{q(u)q(F)q(L)q(\beta)}[\mathcal{L}_W] - KL(q(U_\beta) \| p(U_\beta)) -$$

$$KL(q(U_\mu) \| p(U_\mu)) - \sum_{i,j} KL(q(u_{ij}) \| p(u_{ij})) - KL(q(\ell) \| p(\ell)) = \mathcal{L},$$

where the first term of $\mathcal{L}$ can be further decomposed by plugging in equation (5), $$\mathbb{E}_{q(u)q(F)q(L)q(\beta)}[\mathcal{L}_W] = \sum_{d=1}^{D} \Big( \mathbb{E}_{q(\eta_d)q(\beta_{t_d})}[\log p(W_d \mid \eta_d, \beta_{t_d})] - \qquad (14)$$

$$\mathbb{E}_{q(\eta_d)q(\mu_{t_d})q(F_{t_d})q(L)}[KL(q(\eta_d) \| p(\eta_d \mid \mu_{t_d}, \Sigma_{t_d}))] \Big).$$

This formulation allows mini-batch training to be performed by data sub-sampling. For each mini-batch, the training dataset 908 is randomly sub-sampled and the term $\mathbb{E}_{q(u)q(F)q(L)q(\beta)}[\mathcal{L}_W]$ is re-weighted according to the ratio between the size of training dataset a 908 and the size of the mini-batch as shown in Equation (6).

To test or validate an output of the DCTM 108, a test document from the portion of the training dataset 908 withheld for testing can be provided as input to the DCTM 108. A perplexity is computed using the exponential of the average negative predictive log-likelihood for each word, where the evidence lower bound (ELBO) for the test document is computed using Equation (14).

In a traditional correlated topic model, a prior distribution for mixtures of topics is derived from a multivariate distribution, in which the mean encodes the popularity of a topics while the covariance matrix encodes the co-occurrence of topics in a non-dynamic manner. As described in the generative process 902 and inference process 906, the DCTM 108 extends the prior distribution for mixtures of topics into a dynamic distribution by providing a set of Gaussian processes as the prior distribution for the mean, and generalized Wishart Process as the prior distribution for the covariance matrices. Accordingly, the evolution of the popularity of topics, representations of topics, and their correlations can be jointly modeled over time. Additionally, the SVI method for the DCTM 108 utilizes amortized inference to enable mini-batch training that is scalable to large numbers of data. For example, the DCTM 108 utilizes a deep neural network to encode the variational posterior of the mixtures of topics for individual documents. For the Gaussian processes and the generalized Wishart Process, the DCTM 108 can be augmented with auxiliary variables to derive a scalable variational lower bound. Because the final low bound is intractable, the discrete latent variable are marginalized. Further, a Monte Carlo sampling approximation with the reparameterization trick can be applied to enable a low-variance estimate for the gradients.

Figure 10:
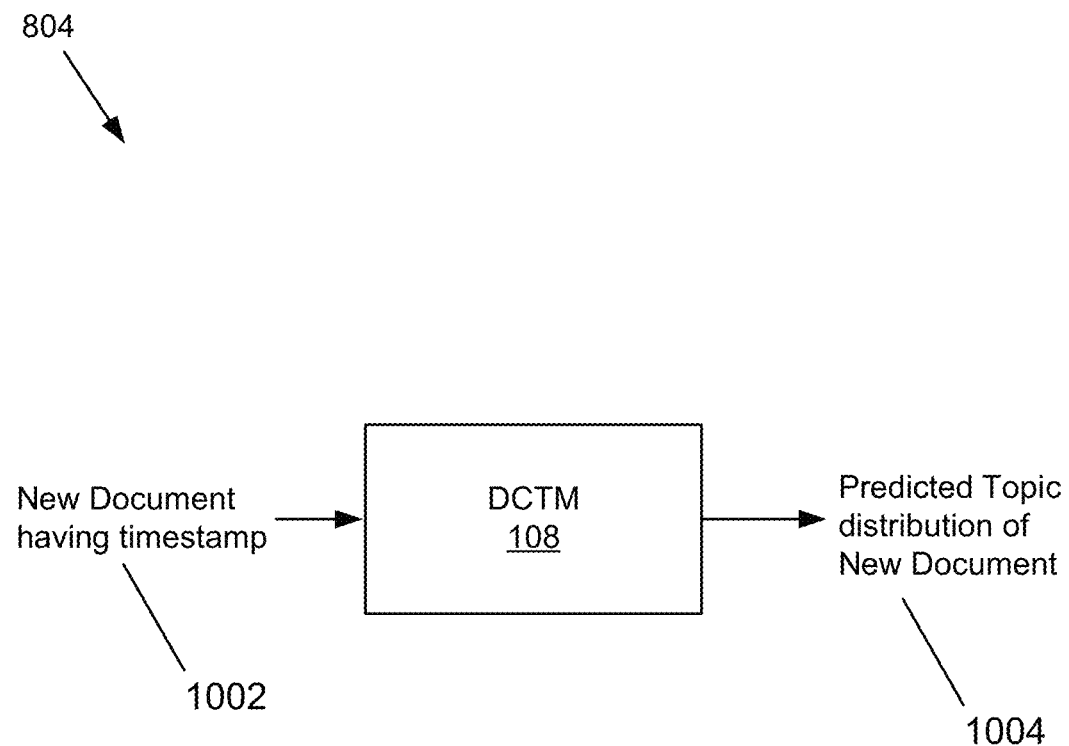
FIG. 10 illustrates an example predicting phase of the DCTM.

FIG. 10 illustrates an example predicting phase 804 of the DCTM 108. During the predicting phase 804, a new document 1002 can be fit to the trained DCTM 108. The new document 1002 can be associated with a timestamp. The DCTM 108 can provide as output a predicted topic distribution 1004 for the new document 1002. The predicted topic distribution 1004 is a document-topic distribution that can include topics that the document 1002 is comprised of and the proportions thereof. For example, the predicted topic distribution 1004 of the new document 1002 may be: 50% topic 1, 40% topic 2, 8% topic 3, and 2% topic 4. When determining the predicted topic distribution 1004, the timestamp associated with the new document 1002 is utilized to account for any changes or evolution in topic popularity, representations, and correlations for the topics over time.

Figure 11:
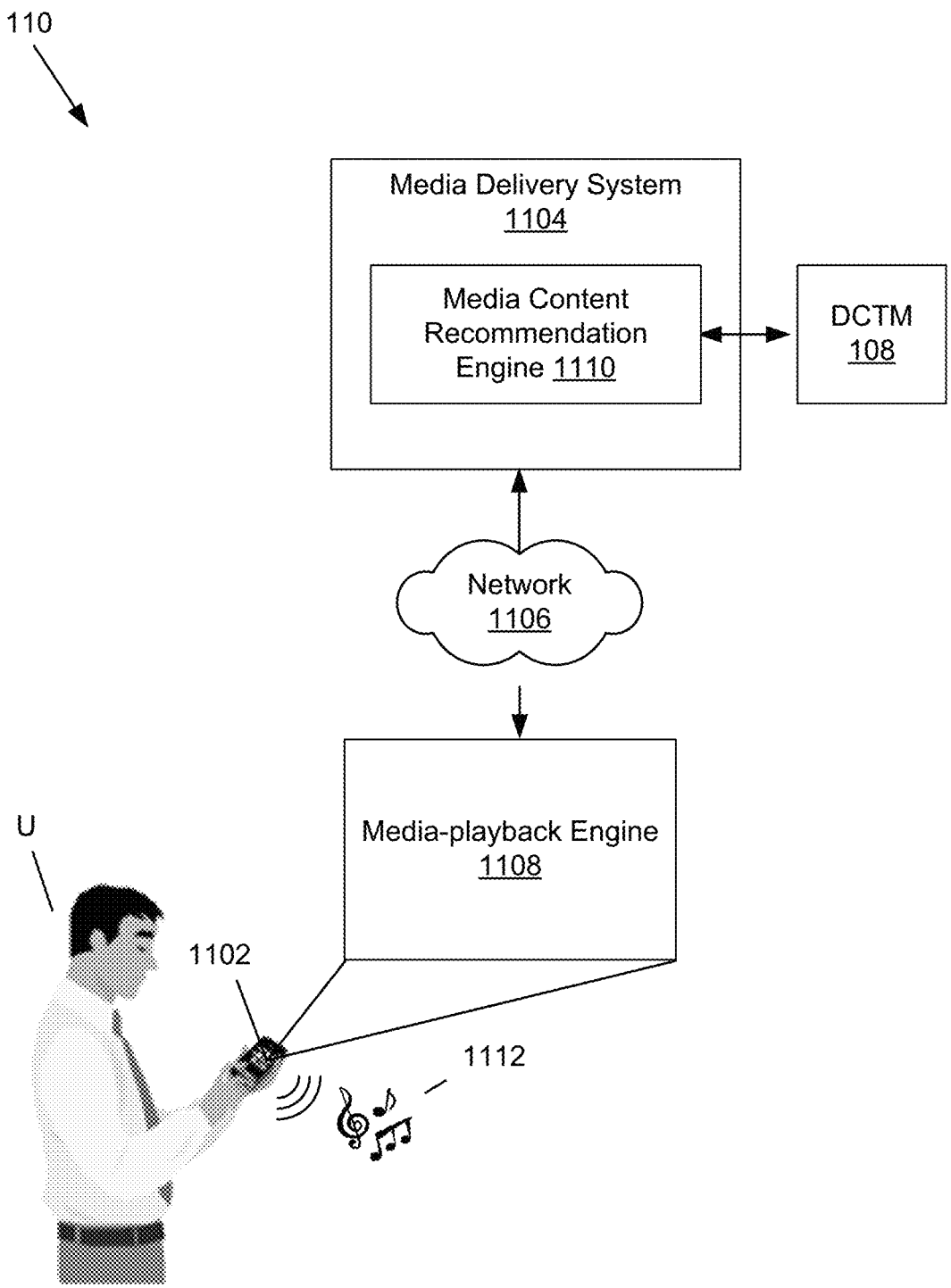
FIG. 11 illustrates an example DCTM-based application system.

FIG. 11 illustrates an example of the DCTM-based application system 110, also referred to hereafter as system 110. In this example, the system 110 is associated with a media streaming service, and includes a media playback device 1102 and a media delivery system 1104. The system 110 communicates across a network 1106. In some embodiments, a media-playback engine 1108 runs on the media playback device 1102, and a media content recommendation engine 1110 runs on the media delivery system 1104. In some embodiments, the DCTM 108 is run on the media delivery system 1104. In other embodiments, the DCTM 108 is an independent system that communicates with the media delivery system 1104 across the network 1106.

Also shown is a user U who uses the media playback device 1102 to continuously play back a plurality of media content items. In some examples, the media content items may be in a form of a playlist, where the playlist may be created based on recommendations from the media content recommendation engine 1110 informed from an output of the DCTM 108. In some examples, the DCTM 108 is trained as described with reference to FIG. 9 based on data specific to the user U (e.g., based on past listening sessions of the user U) and is implemented for that user U. In other examples, the DCTM 108 is trained as described with reference to FIG. 9 based on data received from a plurality of different users (e.g., listening sessions of all users that subscribe to the media streaming service).

The media playback device 1102 operates to play media content items to produce media output 1112. In some embodiments, the media content items are provided by the media delivery system 1104 and transmitted to the media playback device 1102 using the network 1106. A media content item is an item of media content, including audio, video, or other types of media content, which are stored in any format suitable for storing media content. Non-limiting examples of media content items include songs, albums, music videos, movies, television episodes, podcasts, other types of audio or video content, and portions or combinations thereof. In this document, the media content items can also be referred to as tracks.

The media-playback engine 1108 operates to facilitate the playing of media content items on the media playback device 1102. The media delivery system 1104 operates to provide the media content items to the media playback device 1102. In some embodiments, the media delivery system 1104 is connectable to a plurality of media playback devices 1102 and provides the media content items to the media playback devices 1102 independently or simultaneously. Additionally, the media delivery system 1104 operates to provide recommendations for playback of media content items (e.g., in a form of a playlist) to the media playback device 1102.

For example, the media content recommendation engine 1110 operates in conjunction with the DCTM 108 to determine media content items to recommend and provide to the user U for playback, among other recommendations. As described in greater detail with reference to FIG. 13, the DCTM 108 receives, as input, a set of listening sessions associated with the user U that are associated with timestamps spanning a period of time. The listening sessions can be recorded or collected by the media playback device 1102 and provided to the media delivery system 1104 over the network 1106 for storage. The media delivery system 1104 can then provide the listening sessions to the DCTM 108. A listening session is comprised of a plurality of media content items, which can also be referred to as tracks, each media content item having associated media content metadata such as artist, genre, mood, acoustic metadata, era, title, album, and length. For purposes of processing by the DCTM 108, media content metadata for a media content item of a listening session is analogous to words of a document of a set of documents. In other words, the media content metadata is a vocabulary over which topics are distributed.

The DCTM 108 can process the set of listening sessions of the user U similar to the set of documents, as discussed in detail above, to model an evolution of how the user U is consuming media content items from the media delivery system 1104 over that period of time. For example, as described in greater detail with reference to FIG. 13, the DCTM 108 can identify clusters or groupings of artists, genres, or moods for example, that represent topics over the period of time. The output of the DCTM 108 can include, for each topic, a popularity of the topic at a given time, a representation of the topic at a given time, and a correlation with other topics at a given time. In addition to the user-specific output, listening sessions from many different users can be analyzed as a whole such that the evolution modeling performed by the DCTM 108 can be reflective of how the artists and genres themselves, for example, have evolved over time.

The output of the DCTM 108 can be provided as input to the media content recommendation engine 1110. The output of the DCTM 108 can then be used to inform recommendations made by the media content recommendation engine 1110 such that recommended media content items more closely correspond to the evolving media content item preferences of the user U, while also taking into account evolution of the respective artists and genres over time to provide diverse recommendations. In some examples, the recommended media content items can be provided in a form of a playlist.

Figure 12:
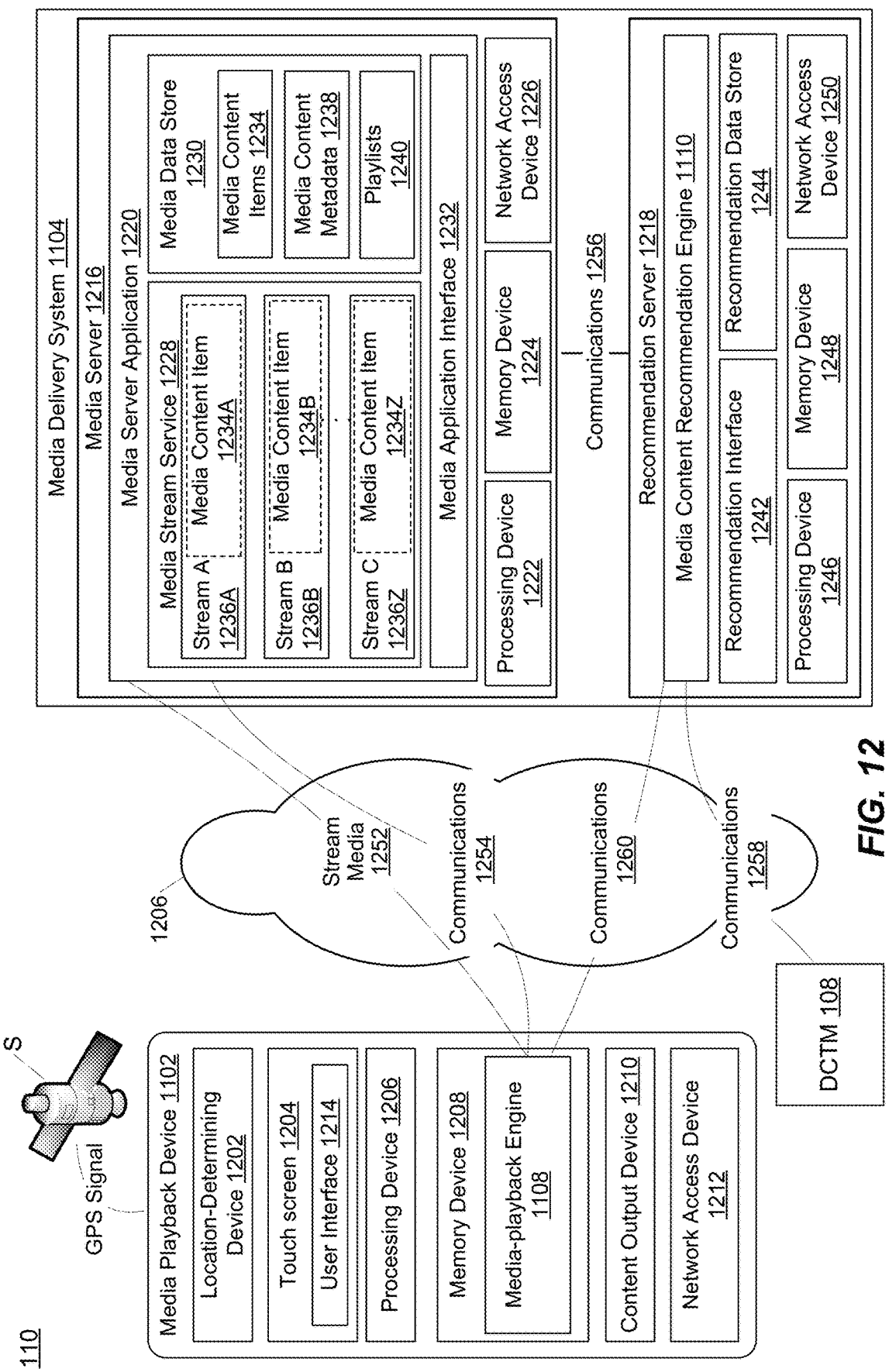
FIG. 12 illustrates an example DCTM-based application system for recommending media content items for playback facilitated by output of the DCTM.

FIG. 12 illustrates in greater detail the example system 110 described with reference to FIG. 11 for generating media content item recommendations facilitated by evolution modeling performed by the DCTM 110. As described herein, the media playback device 1102 operates to play media content items. In some embodiments, the media playback device 1102 operates to play media content items that are provided (e.g., streamed, transmitted, etc.) by a system external to the media playback device such as the media delivery system 1104, another system, or a peer device. Alternatively, in some embodiments, the media playback device 1102 operates to play media content items stored locally on the media playback device 1102. Further, in at least some embodiments, the media playback device 1102 operates to play media content items that are stored locally as well as media content items provided by other systems.

In some embodiments, the media playback device 1102 is a computing device, handheld entertainment device, smartphone, tablet, watch, wearable device, or any other type of device capable of playing media content. In yet other embodiments, the media playback device 1102 is a laptop computer, desktop computer, television, gaming console, set-top box, network appliance, blue-ray or DVD player, media player, stereo, or radio.

In at least some embodiments, the media playback device 1102 includes a location-determining device 1202, a touch screen 1204, a processing device 1206, a memory device 1208, a content output device 1210, and a network access device 1212. Other embodiments may include additional, different, or fewer components. For example, some embodiments may include a recording device such as a microphone or camera that operates to record audio or video content. As another example, some embodiments do not include one or more of the location-determining device 1202 and the touch screen 1204.

The location-determining device 1202 is a device that determines the location of the media playback device 1102. In some embodiments, the location-determining device 1202 uses one or more of the following technologies: Global Positioning System (GPS) technology which may receive GPS signals from satellites S, cellular triangulation technology, network-based location identification technology, Wi-Fi positioning systems technology, and combinations thereof.

The touch screen 1204 operates to receive an input from a selector (e.g., a finger, stylus etc.) controlled by the user U. In some embodiments, the touch screen 1204 operates as both a display device and a user input device. In some embodiments, the touch screen 1204 detects inputs based on one or both of touches and near-touches. In some embodiments, the touch screen 1204 displays a user interface 1214 for interacting with the media playback device 1102. As noted above, some embodiments do not include a touch screen 1204. Some embodiments include a display device and one or more separate user interface devices. Further, some embodiments do not include a display device.

In some embodiments, the processing device 1206 comprises one or more central processing units (CPU). In other embodiments, the processing device 1206 additionally or alternatively includes one or more digital signal processors, field-programmable gate arrays, or other electronic circuits.

The memory device 1208 operates to store data and instructions. In some embodiments, the memory device 1208 stores instructions for a media-playback engine 1108.

The memory device 1208 typically includes at least some form of computer-readable media. Computer readable media include any available media that can be accessed by the media playback device 1102. By way of example, computer-readable media include computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory and other memory technology, compact disc read only memory, blue ray discs, digital versatile discs or other optical storage, magnetic cassettes, magnetic tape, magnetic disk storage or other magnetic storage devices, or any other medium that can be used to store the desired information and that can be accessed by the media playback device 1102. In some embodiments, computer readable storage media is non-transitory computer readable storage media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The content output device 1210 operates to output media content. In some embodiments, the content output device 1210 generates media output 1112 (FIG. 11) for the user U. Examples of the content output device 1210 include a speaker, an audio output jack, a Bluetooth transmitter, a display panel, and a video output jack. Other embodiments are possible as well. For example, the content output device 1210 may transmit a signal through the audio output jack or Bluetooth transmitter that can be used to reproduce an audio signal by a connected or paired device such as headphones or a speaker.

The network access device 1212 operates to communicate with other computing devices over one or more networks, such as the network 1106. Examples of the network access device include wired network interfaces and wireless network interfaces. Wireless network interfaces includes infrared, BLUETOOTH® wireless technology, 802.11a/b/g/n/ac, and cellular or other radio frequency interfaces in at least some possible embodiments.

The media-playback engine 1108 operates to play back one or more of the media content items (e.g., music) to the user U. As described herein, the media-playback engine 1108 is configured to communicate with the media delivery system 1104 to receive one or more media content items (e.g., through the stream media 1252), as well as recommendations (e.g., through communications 1254, 1256 or in the form of playlists received through the stream media 1252).

With still reference to FIG. 12, the media delivery system 1104 includes one or more computing devices and operates to provide media content items to the media playback device 1102 and, in some embodiments, other media playback devices as well. In some embodiments, the media delivery system 1104 operates to transmit the stream media 1252 to media playback devices such as the media playback device 1102.

In some embodiments, the media delivery system 1104 includes a media server 1216 and recommendation server 1218. In this example, the media server 1216 includes a media server application 1220, a processing device 1222, a memory device 1224, and a network access device 1226. The processing device 1222, memory device 1224, and network access device 1226 may be similar to the processing device 1206, memory device 1208, and network access device 1212 respectively, which have each been previously described.

In some embodiments, the media server application 1220 operates to stream music or other audio, video, or other forms of media content. The media server application 1220 includes a media stream service 1228, a media data store 1230, and a media application interface 1232.

The media stream service 1228 operates to buffer media content such as media content items 1234 (including 1234A, 1234B, and 1234Z) for streaming to one or more streams 1236A, 1236B, and 1236Z.

The media application interface 1232 can receive requests or other communication from media playback devices or other systems, to retrieve media content items from the media delivery system 1104. For example, in FIG. 12, the media application interface 1232 receives communications 1254 from the media playback device 1102.

In some embodiments, the media data store 1230 stores media content items 1234, media content metadata 1238, and playlists 1240. The media data store 1230 may comprise one or more databases and file systems. Other embodiments are possible as well. As noted above, the media content items 1234 may be audio, video, or any other type of media content, which may be stored in any format for storing media content.

The media content metadata 1238 operates to provide various pieces of information associated with the media content items 1234. In some embodiments, the media content metadata 1238 includes one or more of title, artist name, album name, length, genre, sub-genre, mood, era, etc. In addition, the media content metadata 1238 includes acoustic metadata which may be derived from analysis of the track. Acoustic metadata may include temporal information such as tempo, rhythm, beats, downbeats, tatums, patterns, sections, or other structures. Acoustic metadata may also include spectral information such as melody, pitch, harmony, timbre, chroma, loudness, vocalness, or other possible features.

One or more types of the media content metadata 1238 can be used by the DCTM 108 to model an evolution of the users' consumption of media content items. For example, artist names can be provided as input the DCTM 108, and clusters or groupings of artists representing topics can be provided as output to show how the user's taste or preference in artists have changed over time, which can be helpful in predicting new media content items to recommend that align with the user's interest but are also diverse. As another example, genres or sub-genres can be provided as input the DCTM 108, and clusters or groupings of genres representing topics can be provided as output to show how the user's taste or preference in genres have changed over time.

The playlists 1240 operate to identify one or more of the media content items 1234. In some embodiments, the playlists 1240 identify a group of the media content items 1234 in a particular order. In other embodiments, the playlists 1240 merely identify a group of the media content items 1234 without specifying a particular order. Some, but not necessarily all, of the media content items 1234 included in a particular one of the playlists 1240 are associated with a common characteristic such as a common genre, mood, or era. In some examples, the group of the media content items 1124 identified within the playlist 1240 may be based on recommendations facilitated by output of the DCTM 108 that are provided by the recommendation server 1218 (e.g., through communications 1256).

In this example, the recommendation server 1218 includes the media content recommendation engine 1110, a recommendation interface 1242, a recommendation data store 1244, a processing device 1246, a memory device 1248, and a network access device 1250. The processing device 1246, memory device 1248, and network access device 1250 may be similar to the processing device 1206, memory device 1208, and network access device 1212 respectively, which have each been previously described.

The media content recommendation engine 1110 operates to determine which of the media content items 1234 to recommend for playback to the user U (e.g., to enhance the listening experience of the user U). In some embodiments, the DCTM 108 facilitates the media content recommendation determinations. The DCTM 108 can be a component of the media content recommendation engine 1110 or a separate component communicatively coupled to the media content recommendation engine 1110.

The DCTM 108 can process listening sessions of the user U that span a period of time to model an evolution of how the user U is consuming media content items from the media delivery system 1104 over that period of time. For example, as described in greater detail with reference to FIG. 13, the DCTM 108 can identify clusters or groupings of artists, genres, and/or moods, among other examples, as topics over the period of time. The output of the DCTM 108 can include, for each topic, a popularity of the topic, a representation of the topic, and a correlation with other topics at given time points across the period of time. The output can be communicated to the media content recommendation engine 1110 (e.g., through the communications 1258).

The recommendation interface 1242 can receive requests or other communication from other systems. For example, the recommendation interface 1242 receives communications 1258 from the DCTM 108, the communications 1258 including above-discussed output of the DCTM 108 to facilitate a determination of media content recommendations. In some examples, the recommendation interface 1242 provides the media server application 1220 with the media content recommendations through communications 1256, such that the media server application 1220 can select media content items 1234 based on the recommendations to provide to the media-playback engine 1108 of the media playback device 1102 for playback (e.g., as stream media 1252). In some examples, the media content items 1124 selected based on the recommendations may be included in a playlist 1240 for provision to the media-playback engine 1108.

In other embodiments, the recommendation interface 1242 may request media content items corresponding to the media content recommendation from the media server application 1220 via the communications 1256. The recommendation interface 1242 can then provide the recommended media content items directly to the media-playback engine 1108 through communication 1260. In some examples, the recommended media content items are presented in a manner (e.g., via the user interface 1214) that notifies the user U that these media content items are recommendations.

In some embodiments, the recommendation data store 1244 stores the output received from the DCTM 108 and the recommendations determined. The recommendation data store 1244 may comprise one or more databases and file systems. Other embodiments are possible as well.

Referring still to FIG. 12, the network 1106 is an electronic communication network that facilitates communication between the media playback device 1102 and the media delivery system 1104. An electronic communication network includes a set of computing devices and links between the computing devices. The computing devices in the network use the links to enable communication among the computing devices in the network. The network 1106 can include routers, switches, mobile access points, bridges, hubs, intrusion detection devices, storage devices, stand-alone server devices, blade server devices, sensors, desktop computers, firewall devices, laptop computers, handheld computers, mobile telephones, and other types of computing devices.

In various embodiments, the network 1106 includes various types of links. For example, the network 1106 can include wired and/or wireless links, including Bluetooth, ultra-wideband (UWB), 802.11, ZigBee, cellular, and other types of wireless links. Furthermore, in various embodiments, the network 1106 is implemented at various scales. For example, the network 1106 can be implemented as one or more local area networks (LANs), metropolitan area networks, subnets, wide area networks (such as the Internet), or can be implemented at another scale. Further, in some embodiments, the network 1106 includes multiple networks, which may be of the same type or of multiple different types.

Although FIG. 12 illustrates only a single media playback device 1102 communicable with a single media delivery system 1104, in accordance with some embodiments, the media delivery system 1104 can support the simultaneous use of multiple media playback devices, and the media playback device can simultaneously access media content from multiple media delivery systems. Additionally, although FIG. 12 illustrates a streaming media based system for recommending media content items based on a modeled evolution of users' consumption of media content items, other embodiments are possible as well.

Figure 13:
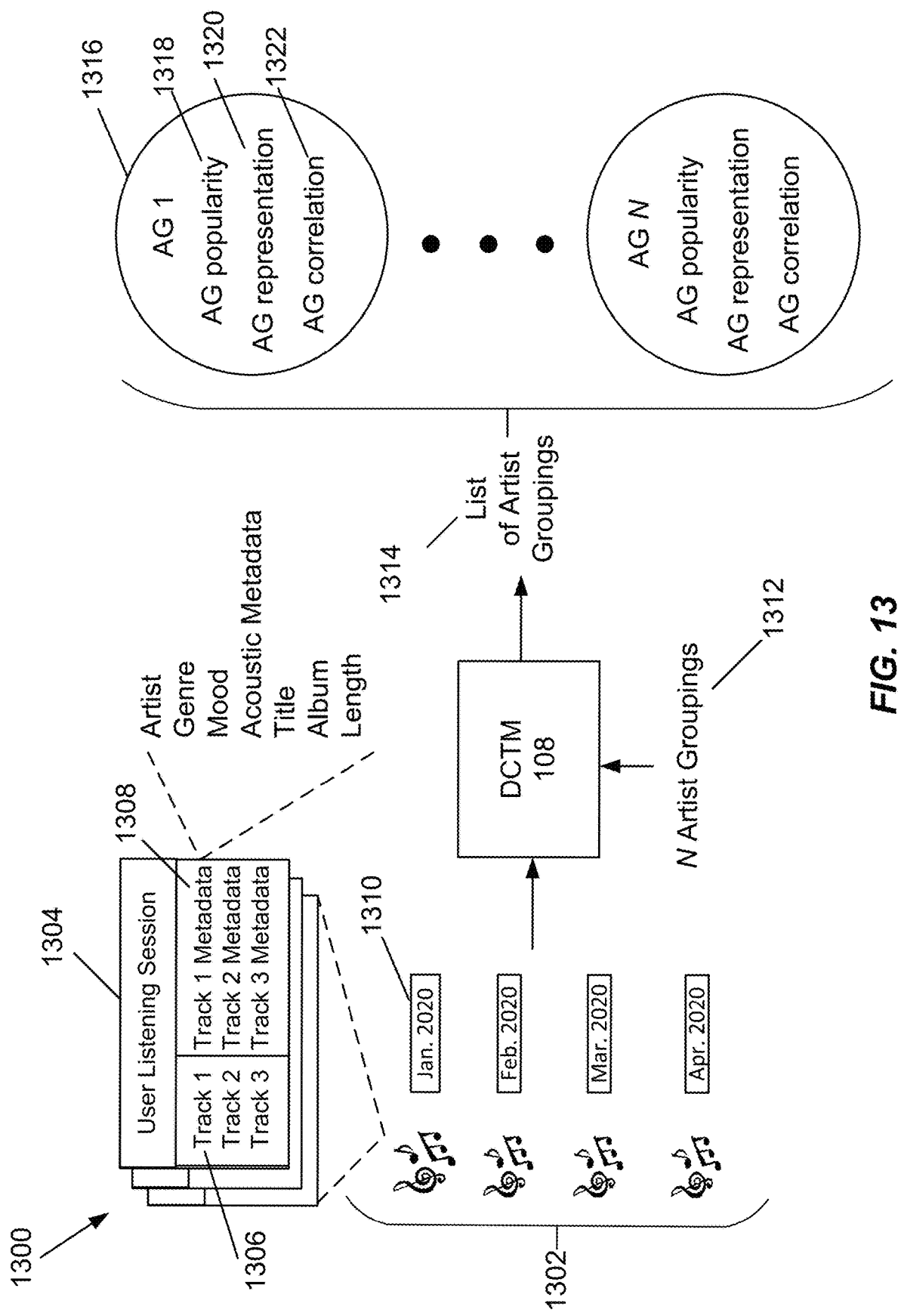
FIG. 13 is a conceptual diagram illustrating a DCTM that models user consumption of media content items over time for facilitating media content item recommendations.

FIG. 13 is a conceptual diagram 1300 illustrating a DCTM 108 that models user consumption of media content items over time for facilitating media content item recommendations. The DCTM 108 receives a set 1302 of user listening sessions 1304 (e.g., listening sessions of user U) as input. A user listening session 1304 is comprised of tracks 1306, also referred to as media content items. Each track 1306 has metadata 1308 associated with the track 1306. Example metadata 1308 is similar to the media content metadata 1238 (FIG. 12), including an artist, genre (or sub-genre), mood, acoustic metadata title album, and length, among other examples. The user listening sessions 1304 are also associated with timestamps 1310 that reflect a point in time at which the user U was listening to the tracks 1306, where the set 1302 spans a period time. More than one user listening session 1304 can be associated with a same timestamp based on a level of granularity selected for analysis by the DCTM 108. For example, all user listening sessions 1304 that occurred within a same month can be associated with a same timestamp for that month.

Additionally, the DCTM 108 receives as quantity of topics 1312 to be modeled as input. The quantity of topics 1312 may also specify which type of metadata 1308 is to be modeled as the topic. For example, the user listening session 1304 can be modeled based on one or more types of the metadata 1308 associated with the tracks 1306 therein. Here, the artists are to be modeled, and thus the quantity indicates N artist groupings. In other words, the artists are the vocabulary for the user listening session 1304 similar to words of a document, and a cluster or grouping of artists represents a topic (e.g., a distribution over the artists).

Depending on the quantity of topics 1312 (e.g., N artist groupings) provided as input and a number of clusters or groupings of the artists that can be drawn from the set 1302 of user listening sessions 1034, a list of artist groupings 1314 output by the DCTM 108 can include all artist groupings inferred or the N most probable artist groupings for the user listening sessions 1304. As the topics are groupings of artists, in some examples, the most probable artists associated with each grouping are provided within the list of artist groupings 1314. For example a top 30 artists associated with artist grouping 1 (e.g., AG 1 in FIG. 13) can be provided to describe artist grouping 1. The artist groupings do not have to be independent of one another. A same artist can be included in more than one grouping. In some examples, an artist grouping can then be labeled or categorized. For example, if artist grouping 1 was represented by artists such as Britney Spears, Christina Aguilera, N*Sync, Backstreet Boys, and the like, artist grouping 1 can be labeled as late 90s Pop Artists.

Additionally, for each artist grouping 1316 in the list of artist groupings 1314, the DCTM 108 can provide a popularity 1318, representation 1320, and correlation 1322 for the artist grouping 1316 at given time points across the period of time that the set 1302 of user listening sessions 1304 spans to illustrate how the popularity, representations, and correlations among artist groupings have evolved over time for the set 1302.

For example, the popularity 1318 of the artist grouping 1316 can be based on a distribution over the artist groupings for each user listening session 1304 at a given time point (e.g., similar to document-topic word distribution). For example, a user listening session 1304 is comprised of x % of artist grouping 1, y % of artist grouping 2, z % of artist grouping 3, etc., where the sum of the percentages for equals 100%. In other words, x % of the tracks 1306 for a user listening session 1304 are associated with an artist from artist grouping 1, y % of the tracks 1306 for the user listening session 1304 are associated with an artist from artist grouping 2, and z % of the tracks 1306 for the user listening session 1304 are associated with an artist from artist grouping 3. The representation 1320 of the artist grouping 1316 can be based on a distribution over the artists for a given artist grouping at a given time point (e.g., similar to topic-word distribution). For example, the distribution can include the most frequently associated artists with the given artist grouping at the given time point. The correlation 1322 for the artist grouping 1316 is a relationship strength between a given artist grouping and one or more other artist groupings at a given time point. The strength of the relationship can be based, at least in part, on a number of common artists shared between the given artist grouping and another artist grouping.

FIG. 13 depicts a non-limiting example where the DCTM 108 identifies underlying artist groupings within the user listening sessions 304 as the topics. In other examples, the DCTM 108 can identify other underlying track metadata groupings within the user listening sessions 304 as the topics, such as genre or sub-genre groupings, to model the evolution of the popularity, representation, and correlations thereof.

Figure 14:
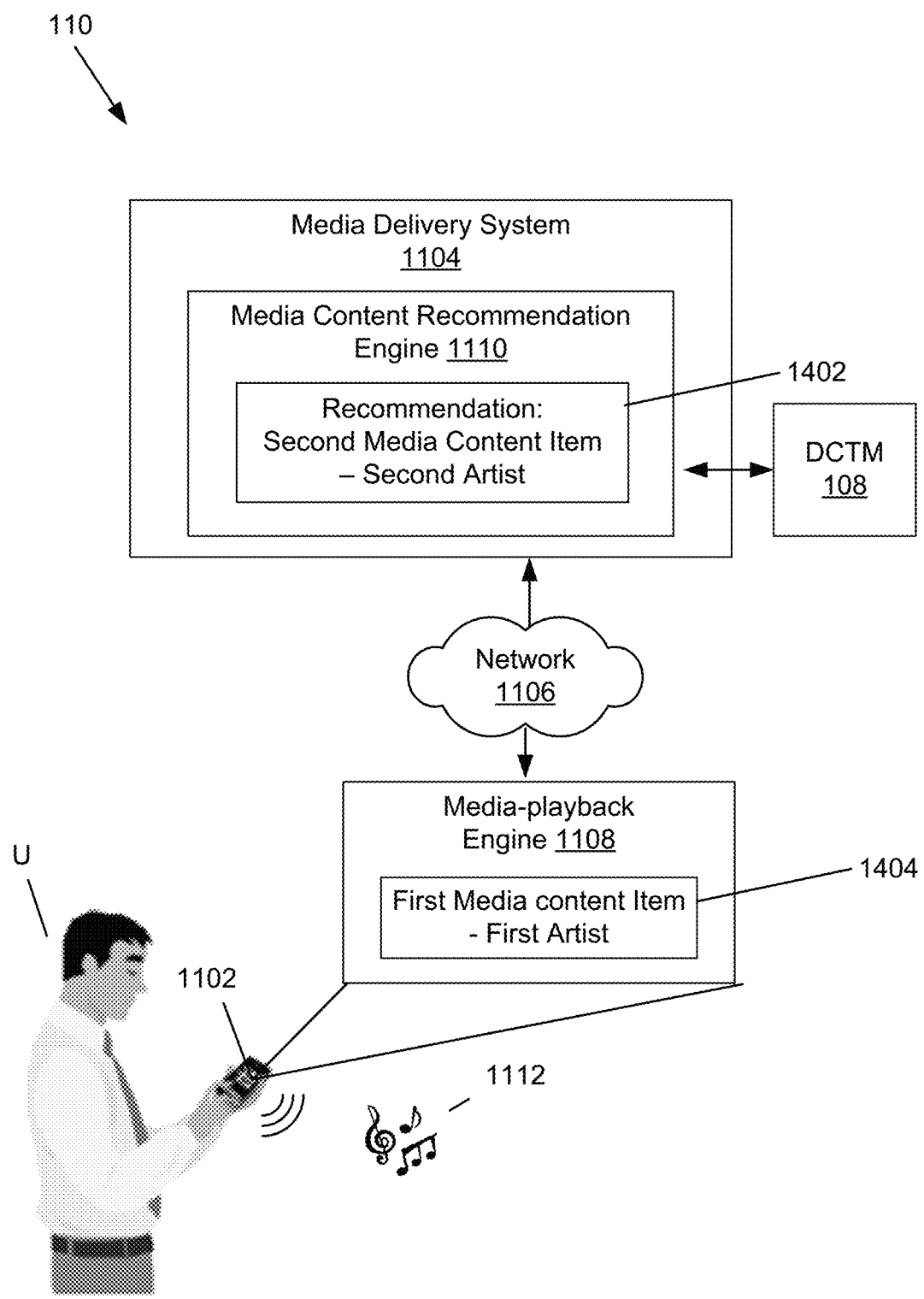
FIG. 14 illustrates an example media content item recommendation facilitated by output of the DCTM.

FIG. 14 illustrates an example media content item recommendation 1402 facilitated by output of the DCTM 108. The media content recommendation engine 1110 of the DCTM-based application system 110, described in detail with reference to FIGS. 11 and 12, generates the media content item recommendation 1402 based on output of the DCTM 108. The output of the DCTM 108 can include at least the list of artist groupings 1314 described with reference to FIG. 13.

The user U is currently listening to a first media content item 1404 (e.g., a track). For example, the media-playback engine 1108 facilitates the playing of the first media content item 1404 on the media playback device 1102, which operates to play the first media content item 1404 to produce media output 1112. The first media content item 1404 is associated with a first artist. In some examples, a name of the first artist is included as part of metadata for the first media content item 1404.

The media-playback engine 1108 can communicate over the network 1106 with the media delivery system 1104 to indicate that the first media content item 1404 is currently being played back on the media playback device 1102. The media-playback engine 1108 can include associated metadata of the first media content item 1404, such as the first artist, within the communication. Additionally or alternatively, the media content recommendation engine 1110 can retrieve such metadata from the media data store 1230 (e.g., media content metadata 1238).

Using the output of the DCTM 108 described in detail with respect to FIG. 13, an artist grouping from the list of artist groupings 1314 that includes the first artist of the first media content item 1404 is identified. In some examples, a second artist can be selected from the same artist grouping that includes the first artist. In other examples, the second artist can be selected from a different artist grouping that is highly correlated with the artist grouping that includes the first artist. A second media content item from media content associated with the second artist can then be identified from the media data store 1230 and provided as the recommendation 1402. In other examples, more than one media content item can be identified and provided in a form of a playlist.

Use of the output of the DCTM 108 to facilitate media content item recommendations, such as the recommendation 1402, enables trend-sensitive recommendations. For example, as the DCTM 108 learns the latent representations or groupings (e.g., artist groupings, genre groupings, mood groupings, etc.) within user listening sessions, they can be used by the media content recommendation engine 1110 to not only predict and recommend the next media content item to listen to, but also and more importantly identify a set of media content items with diverse properties (for example, belonging to different groupings), which can target not only satisfaction metrics of the user U but also diverse recommendations. This is an improvement over current recommendation systems that often train on all user behavior data gathered collectively over time (rather than at individual time points across time like the DCTM 108), which causes these current systems to often be outdated and insensitive to emerging trends in user preference. Using the DCTM 108, it is possible to recommend media content items that are relevant to the current user taste and sensitive to emerging trends, as well as possibly predict future ones.

FIGS. 11 through 14 provide a non-limiting example of the media delivery system 1104 as the DCTM-based application system 110 that uses an evolution of user consumption of media content items modeled by the DCTM 108 to inform recommendations of media content items for the user U.

Additionally, the media delivery system 1104 can utilize the DCTM 108 to discover emerging artists and artist groups to further inform the recommendations. By viewing the artists as the vocabulary, new related artists can be discovered based on a user's recent listening sessions, which is not necessarily what other users are listening to (as "similar artists"), providing further personalization. As every user listening session is a unique collection of topics, the recommendation based on the topics of the current session can offer a new personalized and diversified session creation.

In other examples, the media delivery system 1104 can utilize the DCTM 108 more generally to understand the evolution of artists groups to keep playlists up to date. For example, using the DCTM 108 to model user listening sessions, the media delivery system 1104 can understand an artist grouping from the point of view of the user (e.g., why artists are grouped together). As one example, the artists can be grouped not only by genre, but also based on geographical reasons (e.g., from a same country or region of a country) or shared themes in their tracks. The DCTM 108 can model the relationship between an artist grouping over time to understand how the grouping evolves and changes. Human or machine editors can use this information to create new playlists of media content items, or enable connections between emerging artists while keeping the playlists up to date, and aligned with users' interests. Additionally, this information can be utilized as part of business decisions to determine whether more editors should be dedicated to creating playlists for certain artist groups or genres related to those artist groups to keep up with user demand.

In further examples, the media delivery system 1104 can utilize the DCTM 108 to moderate content of media content items. For at least some types of media content items, such as podcasts, it is important to detect harmful content. However, a direct search of the podcasts for banned keywords is likely not an effective detection method, as synonyms or words with a different meaning are likely to be used to avoid detection. The DCTM 108 can be utilized to understand a relationship between the words and topics that are used in the podcasts, which can aid in detection of potential harmful content. For example, it is likely that the words and topics used to indicate harmful content would be used in a different context than usual, indicating that their meaning could be different and the content of the podcast is potentially harmful.

In yet further examples, the media delivery system 1104 can utilize the DCTM 108 for knowledge graph integration. Knowledge graphs provide a useful way to link together topics and keywords. However, topics in the knowledge graph are often static, meaning that two entities are linked by a fact (i.e., a family relationship), whereas a manner in which topics and keywords are going to be consumed together can depend on other dynamic factors. For example, based on recent news, topics related to "news" and "sports" can be recommended together if something recently occurred in the sports community, or at other times, topics related to "news" and "politics" if something recently occurred in the political community. The DCTM 108 can account for these dynamic factors to ensure that the knowledge graph is up to date reflecting the dynamic changes in trends.

The service 102 hosting the DCTM 108 and/or the DCTM-based application systems 110 that apply the output of the DCTM 108 to other processes are not limited to media streaming or delivery systems. Other example services 102 and/or DCTM-based application systems 110 can include social networking or professional networking systems. For example, social media posts can be modeled by the DCTM 108 to determine emerging or trending topics. As one example, in response to a global pandemic, many users that subscribe to the social networking system are having to now work from home. The DCTM 108 can identify as a topic a distribution of words that are associated with working from home from the social media posts, which be utilized to provide targeted advertising (e.g., noise canceling headphones to deal with those new co-workers) or other similar recommendations within the social networking system. Additionally, the identified topic from social media posts can be provided to other systems, such as a media streaming service, and utilized to inform types of media content recommendations (e.g., stress relieving media content items).

Moreover, in addition to modeling evolution of topic popularity, representation, and correlation over time, the DCTM 108 can also model the evolution thereof based on geography to provide a spatio-temporal perspective. For example, the Gaussian processes utilized for the dynamic modeling, described in detail with respect to FIG. 9, allow multiple indices for each document. Thus, one index can be based on temporal information, and another index can be based on geographic information. As a result, the DCTM 108 can reveal relationships between topics or the probability of a topic based on geographic information.

The various examples and teachings described above are provided by way of illustration only and should not be construed to limit the scope of the present disclosure. Those skilled in the art will readily recognize various modifications and changes that may be made without following the examples and applications illustrated and described herein, and without departing from the true spirit and scope of the present disclosure.

The invention claimed is:

1. A method of using machine learning for dynamically modeling topic correlation over time, the method comprising:
   training a machine learning dynamic correlated topic model (DCTM) to jointly model evolution of a popularity of a topic across a period of time, a representation of the topic across the period of time, and a correlation with other topics across the period of time;
   receiving a set of documents each comprised of a plurality of words and having associated timestamps, wherein the timestamps of the set of documents span a period of time;
   identifying a quantity of topics for modeling;
   providing the set of documents as input to the DCTM for modeling based on the quantity of topics identified; and
   receiving, as output of the DCTM:
   a list of topics, wherein clusters of the plurality of words represent the topics; and
   for each topic:
   a popularity of the topic across the period of time;
   a representation of the topic across the period of time; and
   a correlation with other topics across the period of time, wherein the correlation with other topics changes across the period of time.

2. The method of claim 1, wherein, to model the input, the DCTM analyzes the plurality of words from each document of the set of documents and groups the plurality of words into a number of the clusters to represent the topics, the number of the clusters corresponding to the quantity of topics.

3. The method of claim 2, wherein a same word can be grouped into more than one cluster.

4. The method of claim 3, wherein the DCTM determines the correlation of a topic with other topics based, at least in part, on a commonality of words included within each cluster of the plurality of words representing the respective topics.

5. The method of claim 1, wherein the popularity of the topic across the period of time is based on a document-topic distribution computed by the DCTM at given time points across the period of time, the document-topic distribution determined based at least in part on a topic probability.

6. The method of claim 5, wherein the representation of the topic across the period of time is based on a topic-word distribution computed by the DCTM at given time points across the period of time.

7. The method of claim 6, wherein the DCTM models the topic probability and the topic-word distribution using Gaussian processes.

8. The method of claim 1, wherein the correlation with the other topics across the period of time is based on a series of covariance matrices computed by the DCTM at given time points across the period of time that indicate a strength of relationship of the topic with each of the other topics.

9. The method of claim 8, wherein the DCTM models the series of covariance matrices using a generalized Wishart process.

10. The method of claim 1, wherein the DCTM is trained on at least a portion of the set of documents provided as the input, wherein the training includes execution of a generative process and an inference process.

11. The method of claim 10, further comprising:
providing a new document having an associated time stamp to the trained DCTM as input; and
receiving a predicted topic distribution for the new document as output from the DCTM.

12. A system that uses machine learning for dynamically modeling topic correlation over time, the system comprising:
a machine learning dynamic correlated topic model (DCTM); and
a server communicatively coupled to the DCTM, the server comprising at least one processing device and a memory coupled to the at least one processing device and storing instructions, that when executed by the at least one processing device, cause the at least one processing device to:
train the DCTM to jointly model evolution of a popularity of a topic across a period of time, a representation of the topic across the period of time, and a correlation with other topics across the period of time;
receive a set of documents each comprised of a plurality of words and having associated timestamps, wherein the timestamps for the set of documents span a period of time;
identify a quantity of topics for modeling;
provide the set of documents as input to the DCTM for modeling based on the quantity of topics identified; and
receive, as output of the DCTM:
a list of topics, wherein clusters of the plurality of words represent the topics; and
for each topic:
a popularity of the topic across the period of time;
a representation of the topic across the period of time; and
a correlation with other topics across the period of time, wherein the correlation with other topics changes across the period of time.

13. The system of claim 12, wherein the DCTM is configured to:
analyze the plurality of words from each document of the set of documents;
based on the analysis, identify the topics; and
for each topic, model:
topic probability at given time points across the period of time using a Gaussian process, wherein the popularity of the topic is based on a document-topic distribution and the document-topic distribution is determined based, at least in part, on the topic probability;
topic-word distribution at given time points across the period of time using a Gaussian process, wherein the representation of the topic is based on the topic-word distribution; and
a series of covariance matrices using a Wishart process, wherein the correlation with other topics is based on the series of covariance matrices.

14. The system of claim 12, wherein the DCTM is an unsupervised machine learning model trained on at least a portion of the set of documents provided as the input by executing a generative process and an inference process.

15. The system of claim 14, wherein, for the inference process, a stochastic variational inference process is implemented using a deep neural network to perform mini-batch training with stochastic gradient descent.

16. The system of claim 12, wherein the set of documents are a set of user listening sessions each comprised of a plurality of media content items, and the words are one or more types of media content metadata such that clusters of one or more of the media content metadata types represent the topics.

17. The system of claim 16, wherein the one or more types of media content metadata include an artist, a genre, a sub-genre, a mood, an era, acoustic metadata, a title, an album, and length.

18. A system that uses machine learning for dynamically modeling topic correlation related to user consumption of media content items over time, the system comprising:
a machine learning dynamic correlated topic model (DCTM); and
a server communicatively coupled to the DCTM, the server comprising at least one processing device and a memory coupled to the at least one processing device and storing instructions, that when executed by the at least one processing device, cause the at least one processing device to:
train the DCTM to jointly model evolution of a popularity of a topic across a period of time, a representation of the topic across the period of time, and a correlation with other topics across the period of time;
receive a set of user listening sessions each comprised of a plurality of media content items and having associated timestamps, wherein the plurality of media content items include one or more types of media content metadata and timestamps for the set of user listening sessions span a period of time;
identify a quantity of topics for modeling;
provide the set of user listening sessions as input to the DCTM for modeling based on the quantity of topics identified; and
receive, as output of the DCTM:
a list of topics, wherein groupings of at least one type of the one or more types of media content metadata represent the topics; and
for each topic:
a popularity of the topic across the period of time;
a representation of the topic across the period of time; and a correlation with other topics across the period of time, wherein the correlation with other topics changes across the period of time.

19. The system of claim 18, wherein the at least one processing device is further caused to identify a new media content item to provide as a recommendation to the user using the output of the DCTM.

20. The system of claim 19, wherein the media content metadata includes an artist, and when groupings of the artists represent the topics, the at least one processing device, to identify the new media content item, is further caused to:
   determine the user is playing back a first media content item associated with a first artist;
   identify a grouping of the artists that includes the first artist;
   identify a second artist relating to the first artist by selecting the second artist from one of the same grouping of the artists that includes the first artist or another grouping of the artists determined to be correlated to the grouping of the artists that includes the first artist based on the output of the DCTM;
   identify a second media content item from media content associated with the second artist; and
   present the second media content item to the user.

21. The method of claim 1, wherein, as part of an inference process, the machine learning DCTM includes a deep neural network to perform mini-batch training.

22. The system of claim 18, wherein, as part of an inference process, the machine learning DCTM includes a deep neural network to perform mini-batch training.

* * * * *